(12) United States Patent
Weinstein et al.

(10) Patent No.: US 7,881,229 B2
(45) Date of Patent: Feb. 1, 2011

(54) SYSTEMS AND METHODS FOR FORMING AN ADJACENCY GRAPH FOR EXCHANGING NETWORK ROUTING DATA

(75) Inventors: Joseph J. Weinstein, Somerville, MA (US); Vladimir Rosenzweig, Belmont, MA (US); Joseph Keller, Ledyard, CT (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1811 days.

(21) Appl. No.: 10/913,151

(22) Filed: Aug. 6, 2004

(65) Prior Publication Data

US 2005/0041676 A1    Feb. 24, 2005

Related U.S. Application Data

(60) Provisional application No. 60/493,660, filed on Aug. 8, 2003, provisional application No. 60/550,316, filed on Mar. 8, 2004.

(51) Int. Cl.
*H04L 12/28*    (2006.01)
*G06F 15/173*    (2006.01)

(52) U.S. Cl. ....................... 370/255; 709/223
(58) Field of Classification Search ................. 370/254, 370/255, 256
See application file for complete search history.

(56) References Cited

U.S. PATENT DOCUMENTS 4,718,002 A    1/1988   Carr
4,827,411 A    5/1989   Arrowood et al.
5,079,767 A    1/1992   Perlman
5,093,824 A    3/1992   Coan et al.
5,117,422 A    5/1992   Hauptschein et al.
5,175,843 A   12/1992   Casavant et al.
5,243,592 A    9/1993   Perlman et al.
5,412,654 A    5/1995   Perkins
5,430,729 A    7/1995   Rahnema
5,541,912 A    7/1996   Choudhury et al.
5,649,119 A    7/1997   Kondoh et al.

(Continued)

FOREIGN PATENT DOCUMENTS

EP    0447725 A    9/1991

(Continued)

OTHER PUBLICATIONS

U.S. Appl. No. 09/546,052, filed on Apr. 10, 2000; Joseph Jacob Weinstein et al.; Radio Network Routing Apparatus; 31 pages.

(Continued)

*Primary Examiner*—Ricky Ngo
*Assistant Examiner*—Clemence Han
(74) *Attorney, Agent, or Firm*—Ropes & Gray LLP

(57) ABSTRACT

A system for exchanging routing information over a communications network constructs a connectivity graph that indicates connectivity between a first node and a first set of nodes in the network. The system constructs an adjacency graph that indicates a second set of nodes with which the first node will exchange routing data, where the adjacency graph is distinct from the connectivity graph. The system exchanges routing data between the first node and each node of the second set of nodes based on the adjacency graph.

27 Claims, 21 Drawing Sheets

U.S. PATENT DOCUMENTS

| | | | |
|---|---|---|---|
| 5,742,820 A | 4/1998 | Perlman et al. | |
| 5,764,895 A | 6/1998 | Chung | |
| 5,828,835 A | 10/1998 | Isfeld et al. | |
| 5,850,592 A | 12/1998 | Ramanathan | |
| 5,878,056 A | 3/1999 | Black et al. | |
| 5,878,095 A | 3/1999 | Kainulainen | |
| 5,881,246 A | 3/1999 | Crawley et al. | |
| 5,884,040 A | 3/1999 | Chung | |
| 5,903,735 A | 5/1999 | Kidder et al. | |
| 5,913,921 A | 6/1999 | Tosey et al. | |
| 5,959,989 A | 9/1999 | Gleeson et al. | |
| 5,960,047 A | 9/1999 | Proctor, Jr. et al. | |
| 5,974,327 A | 10/1999 | Agrawal et al. | |
| 6,000,011 A | 12/1999 | Freerksen et al. | |
| 6,028,857 A | 2/2000 | Poor | |
| 6,032,190 A | 2/2000 | Bremer et al. | |
| 6,046,978 A * | 4/2000 | Melnik | 370/221 |
| 6,067,301 A | 5/2000 | Aatresh | |
| 6,069,895 A | 5/2000 | Ayandeh | |
| 6,088,622 A | 7/2000 | Dollin et al. | |
| 6,088,734 A | 7/2000 | Marin et al. | |
| 6,092,096 A | 7/2000 | Lewis | |
| 6,094,435 A | 7/2000 | Hoffman et al. | |
| 6,122,753 A | 9/2000 | Masuo et al. | |
| 6,139,199 A | 10/2000 | Rodriguez | |
| 6,151,308 A | 11/2000 | Ibanez-Meier et al. | |
| 6,173,324 B1 * | 1/2001 | D'Souza | 709/224 |
| 6,215,765 B1 | 4/2001 | McAllister et al. | |
| 6,216,167 B1 | 4/2001 | Momirov | |
| 6,252,856 B1 | 6/2001 | Zhang | |
| 6,262,976 B1 | 7/2001 | McNamara | |
| 6,272,567 B1 | 8/2001 | Pal et al. | |
| 6,275,492 B1 | 8/2001 | Zhang | |
| 6,304,548 B1 | 10/2001 | Shaffer et al. | |
| 6,304,556 B1 * | 10/2001 | Haas | 370/254 |
| 6,310,883 B1 | 10/2001 | Mann et al. | |
| 6,330,459 B1 | 12/2001 | Crichton et al. | |
| 6,349,091 B1 | 2/2002 | Li | |
| 6,362,821 B1 | 3/2002 | Gibson et al. | |
| 6,385,673 B1 | 5/2002 | DeMoney | |
| 6,385,714 B1 | 5/2002 | Li | |
| 6,396,814 B1 * | 5/2002 | Iwamura et al. | 370/256 |
| 6,418,299 B1 | 7/2002 | Ramanathan | |
| 6,456,599 B1 * | 9/2002 | Elliott | 370/254 |
| 6,470,329 B1 | 10/2002 | Livschitz | |
| 6,473,421 B1 | 10/2002 | Tappan | |
| 6,473,434 B1 | 10/2002 | Araya et al. | |
| 6,496,510 B1 | 12/2002 | Tsukakoshi et al. | |
| 6,542,469 B1 | 4/2003 | Kelley et al. | |
| 6,570,867 B1 | 5/2003 | Robinson et al. | |
| 6,574,227 B1 | 6/2003 | Rosenberg et al. | |
| 6,594,268 B1 | 7/2003 | Aukia et al. | |
| 6,611,522 B1 | 8/2003 | Zheng et al. | |
| 6,628,929 B1 | 9/2003 | Nomura et al. | |
| 6,631,136 B1 | 10/2003 | Chowdhury et al. | |
| 6,633,544 B1 * | 10/2003 | Rexford et al. | 370/238 |
| 6,671,819 B1 | 12/2003 | Passman et al. | |
| 6,683,885 B1 | 1/2004 | Sugai et al. | |
| 6,687,781 B2 | 2/2004 | Wynne et al. | |
| 6,714,563 B1 | 3/2004 | Kushi | |
| 6,721,273 B1 | 4/2004 | Lyon | |
| 6,745,224 B1 | 6/2004 | D'Souza et al. | |
| 6,769,043 B1 | 7/2004 | Fedorkow et al. | |
| 6,804,236 B1 | 10/2004 | Mahajan et al. | |
| 6,807,158 B2 | 10/2004 | Krishnamurthy et al. | |
| 6,807,172 B1 | 10/2004 | Levenson et al. | |
| 6,829,222 B2 * | 12/2004 | Amis et al. | 370/238 |
| 6,870,846 B2 * | 3/2005 | Cain | 370/392 |
| 6,954,449 B2 | 10/2005 | Cain et al. | |
| RE38,902 E | 11/2005 | Srisuresh et al. | |
| 6,977,895 B1 | 12/2005 | Shi et al. | |
| 6,977,937 B1 | 12/2005 | Weinstein et al. | |
| 6,980,515 B1 | 12/2005 | Schunk et al. | |
| 6,980,537 B1 | 12/2005 | Liu | |
| 6,990,350 B2 | 1/2006 | Davis et al. | |
| 7,020,501 B1 | 3/2006 | Elliott et al. | |
| 7,020,701 B1 | 3/2006 | Gelvin et al. | |
| 7,039,720 B2 | 5/2006 | Alfieri et al. | |
| 7,042,834 B1 | 5/2006 | Savage | |
| 7,042,837 B1 | 5/2006 | Cassiday et al. | |
| 7,046,628 B2 | 5/2006 | Luhmann et al. | |
| 7,065,059 B1 * | 6/2006 | Zinin | 370/312 |
| 7,068,971 B2 | 6/2006 | Abutaleb et al. | |
| 7,072,952 B2 * | 7/2006 | Takehiro et al. | 709/221 |
| 7,103,344 B2 | 9/2006 | Menard | |
| 7,106,703 B1 | 9/2006 | Belcea | |
| 7,120,120 B2 | 10/2006 | Guerin et al. | |
| 7,171,476 B2 * | 1/2007 | Maeda et al. | 709/227 |
| 7,177,295 B1 * | 2/2007 | Sholander et al. | 370/338 |
| 7,184,421 B1 | 2/2007 | Liu et al. | |
| 7,200,120 B1 | 4/2007 | Greenberg et al. | |
| 7,215,926 B2 | 5/2007 | Corbett et al. | |
| 7,254,111 B2 | 8/2007 | Choe et al. | |
| 7,266,386 B2 | 9/2007 | Kim et al. | |
| 7,281,057 B2 * | 10/2007 | Cain | 709/238 |
| 7,289,456 B2 | 10/2007 | Gupta et al. | |
| 7,353,259 B1 | 4/2008 | Bakke et al. | |
| 7,369,512 B1 | 5/2008 | Shurbanov et al. | |
| 2001/0007560 A1 | 7/2001 | Masuda et al. | |
| 2001/0034793 A1 | 10/2001 | Madruga et al. | |
| 2001/0040895 A1 | 11/2001 | Templin | |
| 2001/0045914 A1 | 11/2001 | Bunker | |
| 2002/0016869 A1 | 2/2002 | Comeau et al. | |
| 2002/0029214 A1 | 3/2002 | Yianilos et al. | |
| 2002/0057660 A1 | 5/2002 | Park et al. | |
| 2002/0067693 A1 | 6/2002 | Kodialam et al. | |
| 2002/0071392 A1 * | 6/2002 | Grover et al. | 709/238 |
| 2002/0075813 A1 | 6/2002 | Baldonado et al. | |
| 2002/0080755 A1 | 6/2002 | Tasman et al. | |
| 2002/0103893 A1 * | 8/2002 | Frelechoux et al. | 709/223 |
| 2002/0108107 A1 | 8/2002 | Darnell et al. | |
| 2002/0131409 A1 | 9/2002 | Frank et al. | |
| 2002/0143755 A1 | 10/2002 | Wynblatt et al. | |
| 2002/0176390 A1 | 11/2002 | Sparr et al. | |
| 2002/0186694 A1 | 12/2002 | Mahajan et al. | |
| 2002/0191545 A1 | 12/2002 | Pieda et al. | |
| 2003/0012168 A1 | 1/2003 | Elson et al. | |
| 2003/0016624 A1 | 1/2003 | Bare | |
| 2003/0022476 A1 | 1/2003 | Hardee | |
| 2003/0043742 A1 | 3/2003 | De Maria et al. | |
| 2003/0048771 A1 | 3/2003 | Shipman | |
| 2003/0058852 A1 | 3/2003 | Luhmann et al. | |
| 2003/0063613 A1 | 4/2003 | Carpini et al. | |
| 2003/0093576 A1 | 5/2003 | Dettinger et al. | |
| 2003/0096577 A1 | 5/2003 | Heinonen et al. | |
| 2003/0124976 A1 | 7/2003 | Tamaki et al. | |
| 2003/0126284 A1 | 7/2003 | Houston et al. | |
| 2003/0152182 A1 | 8/2003 | Pai et al. | |
| 2003/0153338 A1 | 8/2003 | Herz et al. | |
| 2003/0174654 A1 | 9/2003 | Tateson et al. | |
| 2003/0174719 A1 | 9/2003 | Sampath et al. | |
| 2003/0179751 A1 | 9/2003 | Omae et al. | |
| 2003/0202476 A1 | 10/2003 | Billhartz et al. | |
| 2004/0001720 A1 | 1/2004 | Krill et al. | |
| 2004/0003111 A1 * | 1/2004 | Maeda et al. | 709/237 |
| 2004/0027284 A1 | 2/2004 | Leeper et al. | |
| 2004/0029553 A1 | 2/2004 | Cain | |
| 2004/0032856 A1 | 2/2004 | Sandstrom | |
| 2004/0106408 A1 | 6/2004 | Beasley et al. | |
| 2004/0131079 A1 | 7/2004 | Hegde et al. | |
| 2004/0202164 A1 | 10/2004 | Hooper et al. | |
| 2004/0213167 A1 * | 10/2004 | Garcia-Luna-Aceves et al. | 370/254 |
| 2004/0243702 A1 | 12/2004 | Vainio et al. | |

| | | | |
|---|---|---|---|
| 2005/0013613 | A1 | 1/2005 | Stevenson et al. |
| 2005/0030949 | A1 | 2/2005 | Shirakawa et al. |
| 2005/0036442 | A1 | 2/2005 | Saleh et al. |
| 2005/0050221 | A1 | 3/2005 | Tasman et al. |
| 2005/0117914 | A1 | 6/2005 | Chuah et al. |
| 2005/0213586 | A1 | 9/2005 | Cyganski et al. |
| 2007/0106852 | A1 | 5/2007 | Lam et al. |

FOREIGN PATENT DOCUMENTS

| | | |
|---|---|---|
| WO | WO 01/37483 A | 5/2001 |

OTHER PUBLICATIONS

U.S. Appl. No. 10/797, 030, filed on Mar. 11, 2004; Joseph Jacob Weinstein et al.; Systems and Methods for Synchronizing Multiple Copies of a Database Using Database Digest; 49 pages.
U.S. Appl. No. 10/752,988, filed on Jan. 7, 2004; Joseph Jacob Weinstein et al.; Systems and Methods for Constructing a Virtual Model of a Multi-Hop, Multi-Access Network; 81 pages.
U.S. Appl. No. 09/546,052, filed on Apr. 10, 2000; Joseph Jacob Weinstein et al.; Radio Network Routing Apparatus; 31 pages Under examination by Toan D. Nguyen.
"Link-State Routing," John Moy, Ch. 5, "Routing in Communications Networks," ed. Martha Steenstrup, Prentice Hall, pp. 136-157 (1995).
"Packet Radio Routing," Gregory S. Lauer, Ch. 11, "Routing in Communications Networks", ed. Martha Steenstrup, Prentice Hall, pp. 352-396 (1995).
"Packet Radio Network Routing Algorithms: A Survey," J.J. Hahn et al., IEEE Communications Magazine. 22:11, 41-7 (Nov. 1984).
"The Organization of Computer Resources into a Packet Radio Network," R.E. Kahn, IEEE Trans. on Communications. COM-25:1, 168-178 (Jan. 1977).
"Analysis of Routing Strategies for Packet Radio Networks," J.J. Garcia Lune Aceves et al., Proc. of the IEEE INFOCOM '85, Washington, DC, 292-302 (185).
"The DARPA Packet Radio Network Protocols," J. Jubin et al., Proc. of the IEEE, 75:1, 21-32 (Jan. 1987).
CMSC 451, Dave Mount. CMSC 451: Lecture 11. "Articulation Points and Biconnected Components," Tuesday, Oct. 6, 1998. www.cs.umd.edu/~samir/451/bc.ps. pp. 1-5.
Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).
Hsu, et al., "Simpler and Faster Biconnectivity Augmentation," Journal of Algorithms, 45:55-71 (2002).
Jennings, et al., "Topology Control for Efficient Information Dissemination in Ad-hoc Networks," Jet Propulsion Laboratory, pp. 1-7.(2002).
Khuller, et al., "Biconnectivity Approximations and Graph Carvings," Journal of the ACM, 41(2):214-235 (1994).
Li, et al., "Sending Messages to Mobile Users in Disconnected Ad-Hoc Wireless Networks," MOBICOM (2000).
Liao, et al., "GRID: A Fully Location-Aware Routing Protocol for Mobile Ad Hoc Networks," Telecommunications Systems, 18(1):37-60 (2001).
Lin, et al., "Adaptive Clusterin for Mobile Wireless Networks," IEEE Journal on Selected Areas in communications, 15(7):1-21 (1997).
McAuley, et al., "Self-Configuring Networks," MOBICOM pp. 315-319 (2000).
Office Action dated Nov. 2, 2007, U.S. Appl. No. 10/786,335.
Office Action dated Nov. 16, 2007, U.S. Appl. No. 10/649,030.
Office Action dated Nov. 13, 2007, U.S. Appl. No. 10/328,566.
Office Action dated Apr. 18, 2008, U.S. Appl. No. 11/088,045.
Office Action dated Jun. 11, 2008, U.S. Appl. No. 10/786,335.
Basu et al., "Movement Control Algorithms for Realization of Fault-Tolerant Ad Hoc Robot Networks," *IEEE Network*, pp. 36-44, Jul./Aug. 2004.
Bevan et al., "Free-Space Optical Data Bus for Spacecraft", *Earth Science Technology Conference*, Jun. 24-26, 2003, 6 pages.
Choudhury et al., "Using Directional Antennas for Medium Access Control in Ad Hoc Networks", *MOBICOM'* 002, Sep. 23-28, 2002, pp. 59-70.
Everett, "GPM Reference Interfaces", May 30, 2001, 9 pages.
Jacquet et al. "Optimized Link State Routing Protocol for Ad Hoc Networks", *Proc. IEEE INMIC*, Pakistan, pp. 1, 2001.
Karp, B. et al. "GPSR: Greedy Perimeter Stateless Routing for Wireless Networks", 2000 *ACM/IEEE International Conference on Mobile Computing and Networking* (MobiCom 2000).
Lee, S. et al. "Neighbor Supporting Ad Hoc Multicast Routing Protocol" Seoul National Univeristy, 8 pages, 2000.
Lee, Sung-Ju et al. A Performance Comparison Study of Ad Hoc Wireless Multicast Protocols, *University of California*, 10 pages, 2000.
Magness, Rodger, "A Comparison of CAN and Bluetooth Protocols—A Study for Application of CAN over Bluetooth for Wireless Onboard Data Handlin for a Spacecraft Sensor Network", *NASA Astrophysics Data System*, 24 pages, 2003.
McKeown, "A Quick Tutorial on IP Router Design", *Optics and Routing Seminar*, Oct. 10, 2000.
Pascall et al., "Commercial Satellite Communication", 1997 pp. 78-91.
Prague, "Power Line Carrier Techniques Applied to Spacecraft Data Handling, Data Systems in Areospace DASIA", Jun. 2-6, 2003, Czech Republic, 16 pages.
Ramanathan et al., "Topology Control of Multihop Wireless Networks using Transmit Power Adjustment," Proc. *IEEE INFOCOM 2000*, Mar. 2000, 10 pages.
SEA (Group) Ltd., "Terra SAR Equipment Development", 2003 1 page.
Waligore, "Test and Training Technology Workshop" Applied Research Laboratories, Feb. 15, 2002, 27 pages.
Winfield, Alan, "Distributed Sensing and Data Collection Via Broken Ad Hoc Wireless Connected Networks of Mobile Robots," *Springer*, pp. 273-282, (2000).
Office Action dated Jan. 22, 2009, U.S. Appl. No. 10/694,968.
Office Action dated Feb. 24, 2009, U.S. Appl. No. 10/786,335.
Office Action dated May 16, 2007, U.S. Appl. No. 10/702,308.
Office Action dated May 17, 2007, U.S. Appl. No. 10/649,030.
Office Action dated Oct. 3, 2007, U.S. Appl. No. 10/702,308.
Office Action dated Oct. 10, 2006, U.S. Appl. No. 10/649,030.
Office Action dated Oct. 11, 2005, U.S. Appl. No. 10/649,030.
Office Action dated Oct. 27, 2009, U.S. Appl. No. 10/786,335.
Office Action dated Nov. 2, 2009, U.S. Appl. No. 10/752,988.
Office Action dated Apr. 21, 2010, U.S. Appl. No. 10/752,988.
Office Action dated Oct. 28, 2010, U.S. Appl. No. 12/576,170.

\* cited by examiner

SYSTEMS AND METHODS FOR FORMING AN ADJACENCY GRAPH FOR EXCHANGING NETWORK ROUTING DATA

CROSS REFERENCE TO RELATED APPLICATIONS

The instant application claims priority from provisional application No. 60/493,660, filed Aug. 8, 2003; and provisional application No. 60/550,316, filed Mar. 8, 2004; the disclosures of which are incorporated herein by reference in their entireties.

RELATED APPLICATION

The present application is related to U.S. patent application Ser. No. 09/546,052, entitled "Radio Network Routing Apparatus," and filed Apr. 10, 2000, the disclosure of which is incorporated herein by reference in its entirety.

The present application is further related to U.S. patent application Ser. No. 10/752,988, entitled "Systems and Methods for Constructing a Virtual Model of a Multi-Hop, Multi-Access Network," and filed Jan. 7, 2004, the disclosure of which is incorporated herein by reference in its entirety.

The present application is also related to U.S. patent application Ser. No. 10/797,030, entitled "Systems and Methods for Synchronizing Multiple Copies of a Database Using Database Digests," and filed Mar. 11, 2004, the disclosure of which is incorporated herein by reference in its entirety.

GOVERNMENT CONTRACT

The U.S. Government has a paid-up license in this invention and the right in limited circumstances to require the patent owner to license others on reasonable terms as provided for by the terms of Contract No. DAAB-07-02-C-C403 awarded by the United States Army.

FIELD OF THE INVENTION

Implementations consistent with the principles of the invention relate generally to digital communications networks and, more particularly, to systems and methods for selecting a set of adjacencies to be used for exchanging routing data in digital communications networks.

BACKGROUND OF THE INVENTION

Existing wired communications networks, such as, for example, the Internet, use various algorithms for disseminating routing data necessary for routing packets from a source node to a destination node. Each node of the network that handles packets needs sufficient knowledge of the network topology such that it can choose the right output interface through which to forward received packets. Link state routing algorithms, such as the Open Shortest Path First (OSPF) algorithm, permit the construction of a network topology such that any given node in the network may make packet-forwarding decisions. OSPF is defined by Internet RFC 2328, STD 54, and related documents, published by the Internet Society. OSPF is also defined by Internet RFC 2740, and related documents, also published by the Internet Society.

OSPF has conventionally been implemented in wired point-to-point or multi-access (Ethernet like) networks. It may also be highly desirable to implement OSPF over a multi-hop, multi-access packet radio network with its own private, internal routing system (such as a MANET, or "Mobile Ad-hoc NETwork"), so as to permit seamless integration of such a network into an OSPF environment, and to achieve strict compatibility between that packet radio network and standard COTS (Commercial Off-The-Shelf) routers outside that network. This can be achieved either by implementing OSPF at a higher layer over the multi-hop, multi-access packet radio network on top of that network's private, internal routing system, or by implementing both routing systems in parallel at the same network layer. In such a scheme, OSPF would be responsible for routing between the packet radio network and external hosts or networks, while the packet radio network's internal routing system would handle routing of packets within the packet radio network. Similar schemes are commonly used to implement OSPF over, for example, an X.25 packet switched network or an ATM packet network, and are well-known to practitioners of the art.

However, a number of difficulties may arise if OSPF is implemented over a multi-hop, multi-access packet radio network with its own private, internal routing system. Although the private, internal routing system of such a network may enable it to appear to OSPF much like a wired network, the properties and characteristics of such radio networks are nevertheless very different from those of wired point-to-point or multi-access networks. Like an Ethernet, such radio networks link together a large number of routers; and also like an Ethernet, such networks typically provide a suite of unicast, multicast, and netwide broadcast services. However, unlike an Ethernet, such networks possess internal structure of their own. On one hand, both unicast and multicast packets containing routing data may need to be relayed across the network by multiple lower-layer hops in accordance with the network's private routing scheme, and replicated many times in the process. On the other hand, there exist possibilities for spatial reuse in a multi-hop radio network that do not exist on an Ethernet. Consequently, the standard OSPF mechanisms for distribution of routing data may not be appropriate.

Even worse, the structure of the radio network may fluctuate and, hence, the cost of transporting routing information may be constantly changing due to radio mobility, interference, fading, and other causes. Furthermore, the capacity and reliability of such networks is typically much lower than for an Ethernet, and delays much longer; capacity is limited by the available radio bandwidth, reliability is reduced by increased risks of collisions, interface, noise, and fading, and by the possibility of transient routing inconsistencies at the lower layer; and delay is increased by the multi-hop relaying at the intranet layer.

Furthermore, the need to replicate packets within such a network for either unicast or multicast forwarding may introduce or exacerbate problems involved in scaling to networks with large numbers of nodes, especially large numbers of OSPF routers. This is especially unfortunate, as certain applications may require thousands of OSPF routers on such a network.

In particular, the adoption of the standard OSPF multi-access network "designated router" model for distribution of routing information over a multi-hop routing network is inappropriate. While the distribution of routing information from the "designated router" to other routers on the network via multicast can be made reasonably efficient, each routing advertisement must still be acknowledged back to the designated router by unicast. This, in turn, would result in an implosion of routing acknowledgements in the vicinity of the designated router that preclude scaling to large networks by exploiting spatial reuse.

Likewise, the adoption of the alternative standard OSPF point-to-multipoint network model for distribution of routing information over a multi-hop routing network is equally inappropriate. The links employed by a point-to-multipoint model to represent the radio network are likely to be several radio hops in length, and so their use to distribute routing information would often require packet replication and/or result in transmitting duplicate information over a single radio link. Furthermore, the network of links needed by a point-to-multipoint model to represent the radio network may be much more dense than required for distribution of routing information. Finally, this network of links may be constantly changing in response to the need for accurate representation of the radio network, and so may not be sufficiently stable for effective use in distributing routing information.

On the other hand, it is highly desirable to retain the basic OSPF model of reliable flooding, especially when large quantities of external, rarely-changing routing data must be carried across the radio network.

Therefore, there exists a need for systems and methods that can resolve some of the inherent problems that exist with distributing OSPF routing information across a multi-hop, multi-access packet radio network, while maintaining full compatibility with standard OSPF over other networks and preserving the basic OSPF model of reliable flooding.

SUMMARY OF THE INVENTION

In accordance with one aspect consistent with the principles of the invention, a method of exchanging routing data is provided. The method may include constructing a connectivity graph that indicates connectivity between a first node and a first set of nodes in a network. The method may further include constructing an adjacency graph that indicates a second set of nodes with which the first node will exchange routing data, where the adjacency graph may be distinct from the connectivity graph. The method may also include exchanging routing data between the first node and each node of the second set of nodes based on the adjacency graph.

In accordance with another aspect consistent with the principles of the invention, a method of selecting nodes from a group of nodes for exchanging routing data is provided. The method may include acquiring a connectivity graph that indicates connectivity between a first node and a first set of nodes in a network and selecting a second set of nodes from the first set of nodes, where the second set of nodes is a subset of the first set of nodes. The method may further include exchanging routing data between the first node and each node of the selected second set of nodes.

In accordance with yet another aspect consistent with the principles of the invention, a method of selecting adjacent nodes for the exchange of routing data is provided. The method may include acquiring a connectivity graph that indicates connectivity between a first node and a group of other nodes, where node identifying ordinal numbers are associated with each of the first node and the group of other nodes. The method may further include searching the connectivity graph to locate a second node within a distance of $C_1$ from the first node that belongs to the same Open Shortest Path First (OSPF) area and that has at least one of a highest or lowest ordinal number within that search distance. The method may also include exchanging routing data with the second node if the second node exists and is located within the distance of $C_1$.

In accordance with yet a further aspect consistent with the principles of the invention, a method of selecting adjacent nodes for the exchange of routing data in a network is provided. The method may include acquiring a connectivity graph that indicates connectivity between multiple routers and electing one or more nodes from the connectivity graph as a head of a cluster of a set of routers of the multiple routers. The method may further include forming, for every router of the connectivity graph that is not a cluster head, an adjacency with a next hop router along a shortest path to a closest cluster head and selecting one or more routers as adjacency connectors between each of the clusters of routers.

In accordance with another aspect consistent with the principles of the invention, a method of selecting adjacent nodes for the exchange of routing data is provided. The method may include acquiring a connectivity graph that indicates connectivity between multiple nodes. The method may further include determining an area-specific connectivity graph by eliminating from the connectivity graph all nodes that are inactive, external, or do not belong to the current Open Shortest Path First (OSPF) area. The method may also include determining a shortest-path spanning tree of the connectivity graph, where the shortest-path spanning tree comprises a set of nodes of the multiple nodes. The method may additionally include exchanging routing data between each of the nodes of the set of nodes of the shortest-path spanning tree.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods, consistent with the present invention, modify the basic OSPF adjacency graph construction algorithm to optimize it for use over a multi-hop, multi-access packet radio network, while maintaining compatibility with standard OSPF over other networks and preserving the basic OSPF model for reliable flooding of routing information.

Exemplary Network

Figure 1:
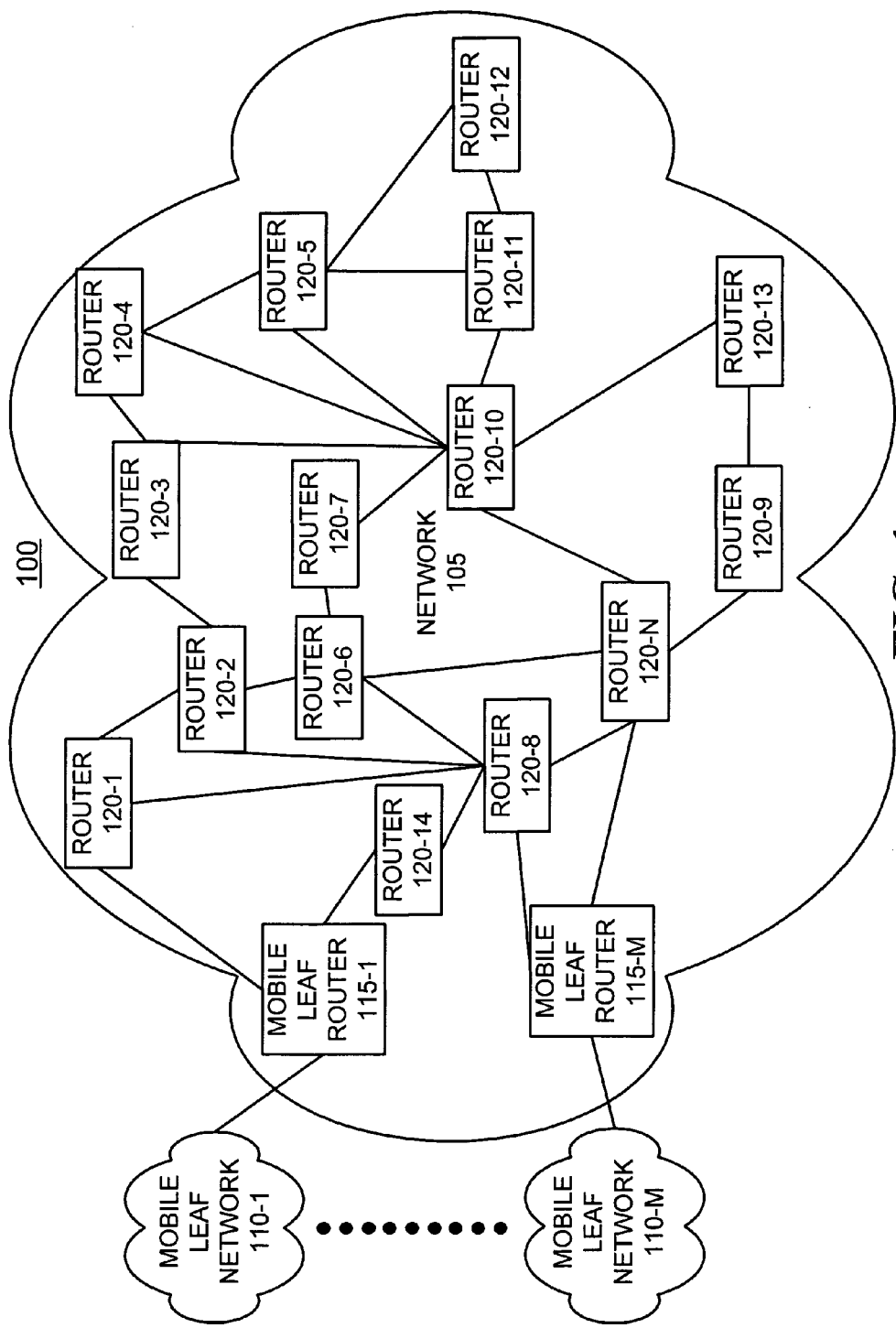
FIG. 1 illustrates an exemplary network in which systems and methods, consistent with the present invention, may be implemented for constructing a network virtual model.

FIG. 1 illustrates an exemplary network 100 in which systems and methods, consistent with the present invention, may construct an adjacency graph that may be used by routers for exchanging routing advertisements. Network 100 may include an autonomous system (AS) that may include a central sub-network 105 interconnected with one or more mobile leaf networks 110-1 through 110-M via respective mobile leaf routers 115-1 through 115-M. Sub-network 105 and mobile leaf networks 110 can include one or more networks of any type, including a local area network (LAN), a metropolitan area network (MAN), a wide area network (WAN), a multi-hop, multi-access packet-switched radio network, or a lower-layer Internet (IP) network such as used by IP over IP, VPN (Virtual Private Networks), or IPSec (IP Security). Network 100 may connect with other networks (not shown) that may include IPv4 or IPv6 networks.

Sub-network 105 may include multiple routers 115-1 through 115-M and 120-1 through 120-N for routing data through sub-network 105. Routers 115-1 through 115-M and 120-1 through 120-N may be interconnected via various links. Mobile leaf routers 115-1 through 115-M may route data between sub-network 105 and mobile leaf sub-networks 110-1 and 110-M, respectively. Routers 115-1 through 115-M and 120-1 through 120-N may be stationary, semi-stationary, or mobile network nodes. Mobile leaf networks 110-1 through 110-M may include networks, such as, for example, local area networks, that are mobile, i.e., whose connectivity to sub-network 105 may change over time.

Network 100 may be divided into multiple OSPF areas, thus, introducing an element of hierarchical routing. For example, sub-network 105 of FIG. 1 may be assigned to a single standard area, and mobile leaf networks 110-1 through 110-M may each be assigned to different mobile leaf areas. In some implementations, sub-network 105 may itself be split among multiple standard OSPF areas (where a standard area is an OSPF area as defined in RFC 2328).

Typically, it may not be necessary for every router to be part of a standard OSPF area. Those routers that interconnect sub-network 105 with external networks in such a way that sub-network 105 may be intended to serve as an alternative transit network to those external networks, or the external network(s) may be intended to serve as an alternative transit network to sub-network 105, may need to be configured into a OSPF standard area.

Those routers that need not be part of a standard OSPF area may often be configured as "mobile leaf" routers instead. Mobile leaf routers, together with the networks 110 behind them, constitute "mobile leaf" areas. Mobile leaf areas may optimize the commonly occurring situation in which a router serves as a single gateway to a set of wired networks. Each mobile leaf area may include this router, known as a "mobile leaf router," together with a set of networks behind it. The mobile leaf router may form an access point between the mobile leaf networks behind it, and sub-network 105. Mobile leaf areas may be mobile, that is, the area including the mobile leaf router and the networks behind it may move around as a whole. As an area moves, its mobile leaf router may dynamically affiliate with one or another standard area router that becomes its border router. Thus, unlike standard OSPF areas whose border routers are manually configured, the border router for a mobile leaf area may be selected dynamically and may change as the mobile leaf router changes its location. These dynamically selected area border routers may be referred to hereinafter as "parent" routers.

A standard area may serve a different role in routing data as compared to mobile leaf areas. A standard area may need to be connected, but mobile leaf areas may not need to be. If a standard area partitions, it may, for example, not be healed by routes through mobile leaf areas. However, if a mobile leaf area with two or more mobile leaf routers partitions, it can be healed by routes through a standard area.

It will be appreciated that the number of routers and mobile leaf networks illustrated in FIG. 1 is provided for explanatory purposes only. A typical network may include more or fewer routers and mobile leaf networks than are illustrated in FIG. 1. Additionally, the various links between the routers of network 100 are shown by way of example only. More, fewer, or entirely different links may connect the various routers of network 100. There may be one or more other networks filling the role of sub-network 105 in network 100. In addition, network 100 may contain other sub-networks (not shown) outside of sub-network 105.

Exemplary Connectivity Graph

Figure 2:
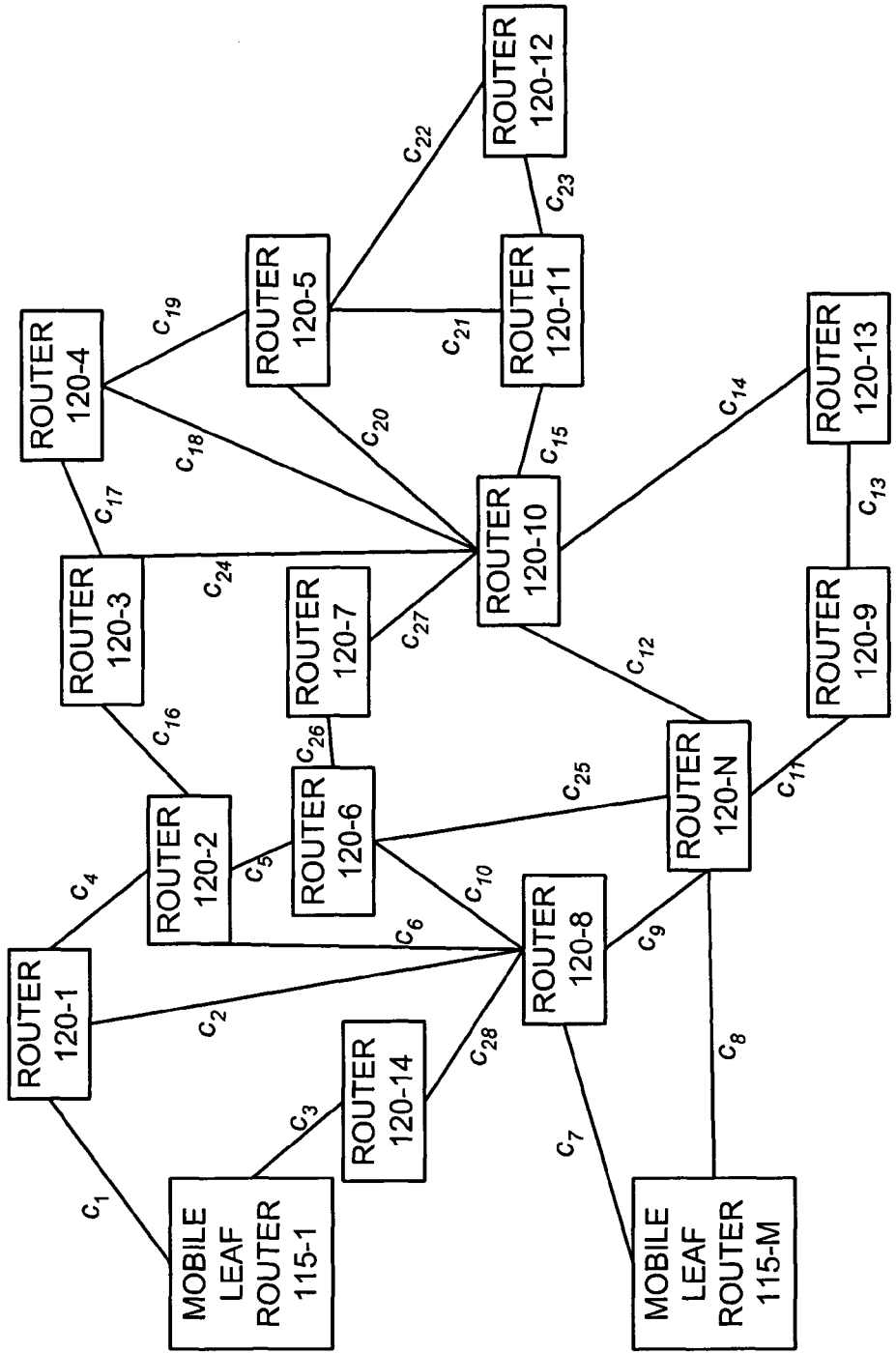
FIG. 2 illustrates an exemplary connectivity graph associated with the network of FIG. 1 consistent with the present invention.

FIG. 2 illustrates an exemplary connectivity graph 200 that represents the actual connectivity of sub-network 105. Each router 115 or 120 may represent a vertex in graph 200, and each one-hop link may be an edge. Each edge may be directed (i.e., uni-directional or bi-directional) and may be associated with a cost (e.g., $c_1$, $c_2$, $c_3$, etc.), or set of costs, that provides an indication of the desirability of sending traffic over the associated link. Connectivity graph 200 may be constructed at each router 115 or 120 from HELLO messages that are received from other routers in network 105. Alternatively, connectivity graph 200 may be constructed at each router 115 or 120 from "simulated HELLO" messages generated by an internal protocol private to sub-network 105, which describes the connectivity of sub-network 105 as known to its private internal routing protocol. The "simulated HELLO" messages may, for example, include the "topology reports" described in co-pending U.S. patent application Ser. No. 09/546,052, entitled "Radio Network Routing Apparatus."

Exemplary Adjacency Graph

Figure 3:
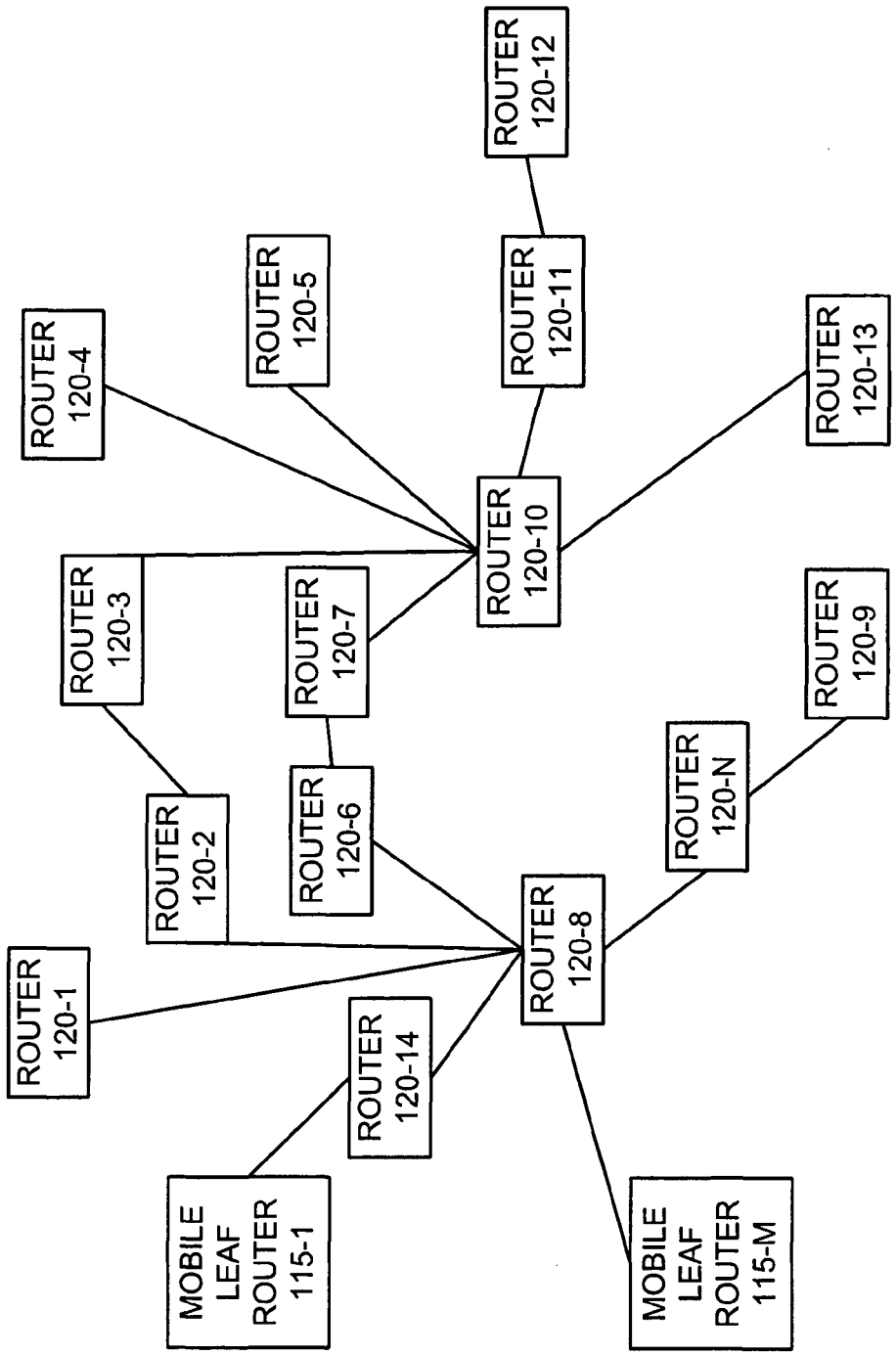
FIG. 3 illustrates an exemplary adjacency graph, corresponding to the connectivity graph of FIG. 2, that may be used by routers for exchanging routing data consistent with the present invention.

FIG. 3 illustrates an exemplary adjacency graph 300 consistent with the invention. Adjacency graph 300 may represent the links among routers 115 or 120 of connectivity graph 200 that will be used for the flooding of routing advertisements. The adjacency graph may not be the same as connectivity graph 200, but may be derived from connectivity graph 200. In some implementations, the edges of adjacency graph 300 may include a subset of the edges of connectivity graph 200.

To reduce flooding overhead, the average local degree at each vertex of adjacency graph 300 should be limited, where the average local degree is the average of the adjacency-graph degree of the vertex at which it is computed and of every other vertex to which that vertex is directly linked in the connectivity graph. Adjacency graph 300, thus, may approximate a sub-graph of minimal degree of connectivity graph 200. Each router in sub-network 105 may have several one-hop neighboring routers, but each router need not form an adjacency with each of the neighboring routers. Instead, each router may only form adjacencies with a selected subset of its neighbors, as long as the graph that results from the cooperative action of the routers in sub-network 105 is connected. After forming adjacencies with selected neighboring routers, each router 115 or 120 may exchange routing information with these adjacent neighbors using a flooding protocol.

Exemplary Router Configuration

Figure 4:
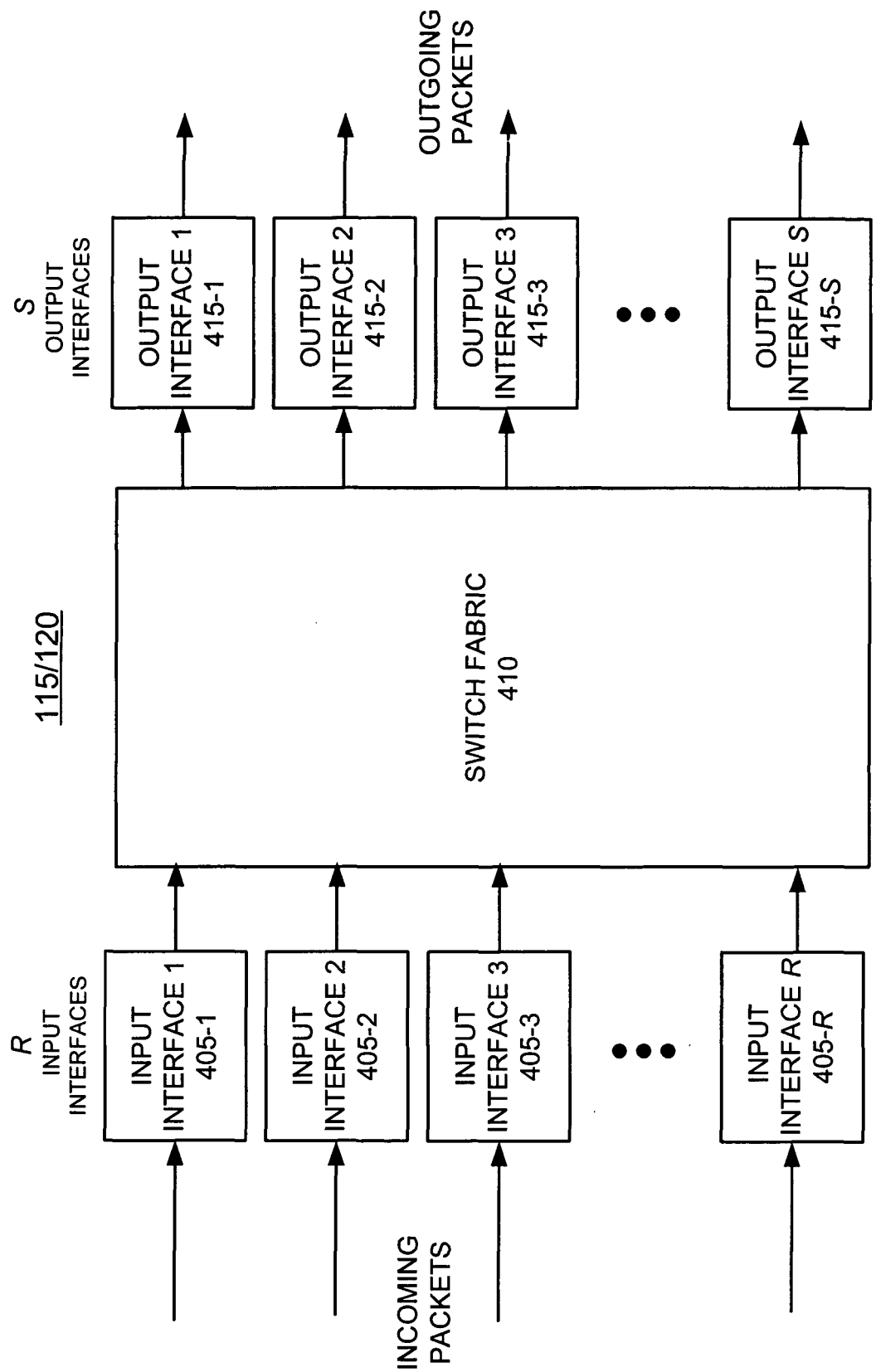
FIG. 4 illustrates an exemplary router configuration consistent with the present invention.

FIG. 4 illustrates exemplary components of a router 115/120 consistent with the present invention. In general, each router 115/120 receives incoming packets, determines the next destination (the next "hop" in sub-network 105) for the packets, and outputs the packets as outbound packets on links that lead to the next destination. In this manner, packets "hop" from router to router in sub-network 105 until reaching their final destination.

As illustrated, router 115/120 may include multiple input interfaces 405-1 through 405-R, a switch fabric 410, and multiple output interfaces 415-1-415-S. Each input interface 405 of router 115/120 may further include routing tables and forwarding tables (not shown). Through the routing tables, each input interface 405 may consolidate routing information learned from the routing protocols of the network. From this routing information, the routing protocol process may determine the active route to network destinations, and install these routes in the forwarding tables. Each input interface 405 may consult a respective forwarding table when determining a next destination for incoming packets. This consultation may involve a two-step process. For instance, certain input interface 405 may first consult a forwarding table constructed by OSPF to determine the desired exit point from network 105, and then a second forwarding table constructed by the private internal routing protocol of network 105 to determine the actual next destination.

In response to consulting a respective forwarding table, each input interface 405 may either set up switch fabric 410 to deliver a packet to its appropriate output interface 415, or attach information to the packet (e.g., output interface number) to allow switch fabric 410 to deliver the packet to the appropriate output interface 415. Each output interface 415 may queue packets received from switch fabric 410 and transmit the packets on to a "next hop."

Exemplary Adjacency Selection Process

Figure 5:
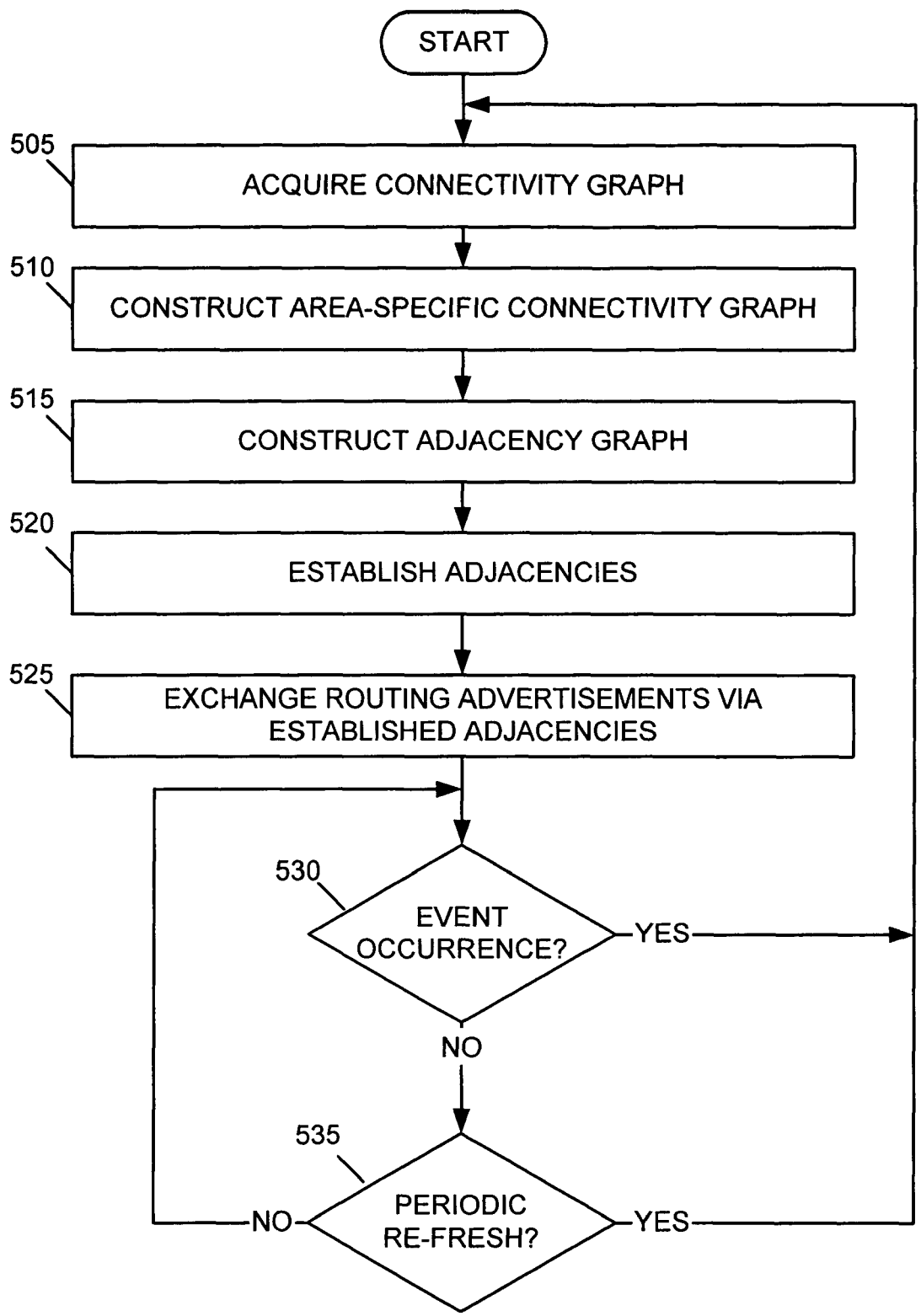
FIG. 5 is a flow chart that illustrates an exemplary process, consistent with the present invention, for selecting adjacencies at a router in a standard area of the network of FIG. 1.

FIG. 5 is a flow chart that illustrates an exemplary process, consistent with the present invention, for selecting a set of neighboring routers with which a standard area router 120 within sub-network 105 may establish an adjacency for the purpose of sending routing advertisements. The exemplary process may begin with the acquisition of a connectivity graph [act 505]. An exemplary connectivity graph 200 is described above with respect to FIG. 2. The connectivity graph may be constructed from simulated HELLO messages that are received from a private routing protocol internal to sub-network 105. These simulated HELLO messages may inform router 120 as to the set of other routers in network 105, their distance from router 120, and their set of one-hop neighbors and distance to each. From these simulated HELLO messages, router 120 can determine its own set of one-hop neighbors, and whether or not it has bi-directional connectivity to each such neighbor. From the simulated HELLO messages, router 120 may construct a graph representing the connectivity with at least a set of other routers in sub-network 105. The simulated HELLO messages discussed above may include the "topology reports" described in co-pending U.S. patent application Ser. No. 09/546,052, entitled "Radio Network Routing Apparatus."

Each standard area router 120 may then construct an area-specific connectivity graph [act 510]. The area-specific connectivity graph may be constructed from the overall connectivity graph for sub-network 105 by eliminating routers that do not belong to the same area and compensating for that by adding additional links and/or adjusting costs of existing links. A router may determine which other routers belong to its area, based upon the IP address of the other router's interface onto sub-network 105, as each area may be assigned a distinct address range. Mobile leaf routers may be identified in the same way, and may not belong to any standard area. In one exemplary vertex elimination technique, routers that lie external to the area to which the current router belongs may be eliminated from the connectivity graph. First, the set of vertices adjacent to the vertex to be eliminated may be eliminated and all edges leading to it can be deleted from the graph. New edges may then be inserted connecting all vertices to which the deleted vertex had previously been adjacent, and assigning costs equal to the sum of the costs along the two edges which a new edge replaces. This process may be repeated until all such vertices have been eliminated.

An adjacency graph may then be constructed [act 515]. FIG. 3 illustrates an exemplary adjacency graph 300 consistent with one implementation of the invention. The constructed adjacency graph may include a set of neighboring nodes with which router 120 may attempt to form adjacencies and exchange routing advertisements. A separate adjacency graph may be constructed for each standard area in network 105. The adjacency graph may be distinct from the connectivity graph and may also be distinct from the advertised model of the network employed for routing purposes, described in co-pending U.S. patent application Ser. No. 10/752,988, entitled "Systems and Methods for Constructing a Virtual Model of a Multi-Hop, Multi-Access Network."

A number of exemplary techniques may be used for constructing an adjacency graph. In one implementation, for example, the adjacency graph may be identical to the area-specific connectivity graph, e.g., every edge in the area-specific connectivity graph becomes an adjacency. The area-specific connectivity graph may be built from the connectivity graph by eliminating routers that do not belong to the standard area in question using a vertex elimination technique as described in paragraph [0054]. This generalizes the adjacency selection method described in co-pending U.S. patent application Ser. No. 09/546,052, entitled "Radio Network Routing Apparatus," to the case where the network is split among multiple OSPF areas.

In another implementation, a spanning tree of the area-specific connectivity graph may be employed as the adjacency graph. For example, a shortest-path spanning tree may be rooted at a selected router. The root may be selected as the lowest numbered, or highest numbered, router in the area-specific connectivity graph. Each other router may then establish an adjacency to the next router on its shortest path through the area-specific connectivity graph to the selected root.

In a further exemplary implementation, a technique that uses a shortest-path forest with an expanding ring search may be employed to construct the adjacency graph. This exemplary technique is further described below with respect to FIG. 8. This exemplary technique creates a spanning forest, with each tree in the forest comprising a shortest-path tree. Each of the shortest-path trees can then be linked together to form a tree rooted at the lowest or highest numbered router in sub-network 105.

In yet another exemplary implementation, a hierarchical distance-based clustering technique may be employed to construct the adjacency graph. This exemplary technique is further described below with respect to FIGS. 10-13. This exemplary technique imposes a hierarchical clustered structure on the connectivity graph to construct the adjacency graph.

In yet another exemplary implementation, a simple ordering rule may be employed to construct the adjacency graph. For instance, each router may select any one lower-numbered neighbor in the area-specific connectivity graph with which to form an adjacency. This suffices to ensure that the adjacency graph will form a tree of the area-specific connectivity graph rooted at the lowest-numbered router in network 105. Alternatively, it may select any one higher-numbered neighbor, producing a tree rooted at the highest-numbered router. Alternatively again, it may select any one lower-numbered neighbor and any one higher-numbered neighbor, thus forming two overlapping trees rooted respectively at the lowest-numbered and highest-numbered router. For maximum efficiency, the router should initially select the closest lower (higher) numbered neighbor as the neighbor with which to form the adjacency. If distances change, it may either retain the original adjacency, or reapply the above rule to select a different lower (higher) numbered neighbor as the neighbor with which to form the adjacency. This exemplary technique is further described below with respect to FIG. 15.

Subsequent to construction of the adjacency graph, adjacencies may then be established with the selected set of neighboring routers [act 520]. Establishment of adjacencies may include the synchronization of routing databases between router 120 and each of the selected set of neighboring routers. Synchronization of routing databases may be performed using the standard OSPF mechanisms described in RFC 2328=STD 54. Alternatively, synchronization of routing databases may include the "database digest" technique described in co-pending U.S. patent application Ser. No. 10/797,030, entitled "Systems and Methods for Synchronizing Multiple Copies of a Database Using Database Digests." Other routing database synchronization techniques, however, may alternatively be employed. Routing advertisements may be exchanged via the established adjacencies [act 525]. The routing advertisements may include routing information that can be used by each of the receiving routers for routing data to appropriate destinations.

A determination may be made whether one or more specified events have occurred [act 530]. The specified events may include, for example, changes to the connectivity graph that may occur when simulated HELLO messages are monitored. If one or more specified events have occurred, the exemplary process may return to act 505 to re-fresh the connectivity graph and/or the adjacency graph. For example, if changes to the connectivity graph are noted, then router 120 may re-initiate acts 505-525. If one or more of the specified events have not occurred, then it may be determined whether a periodic re-fresh is needed [act 535]. For example, acts 505-525 may be re-initiated on a periodic basis (i.e., a periodic "refresh"). If it is not time for a periodic re-fresh, the exemplary process may return to act 530. If it is time for a periodic re-fresh, then the exemplary process may return to act 505.

Exemplary Standard Area Router Connectivity Graph Acquisition Process

Figure 6:
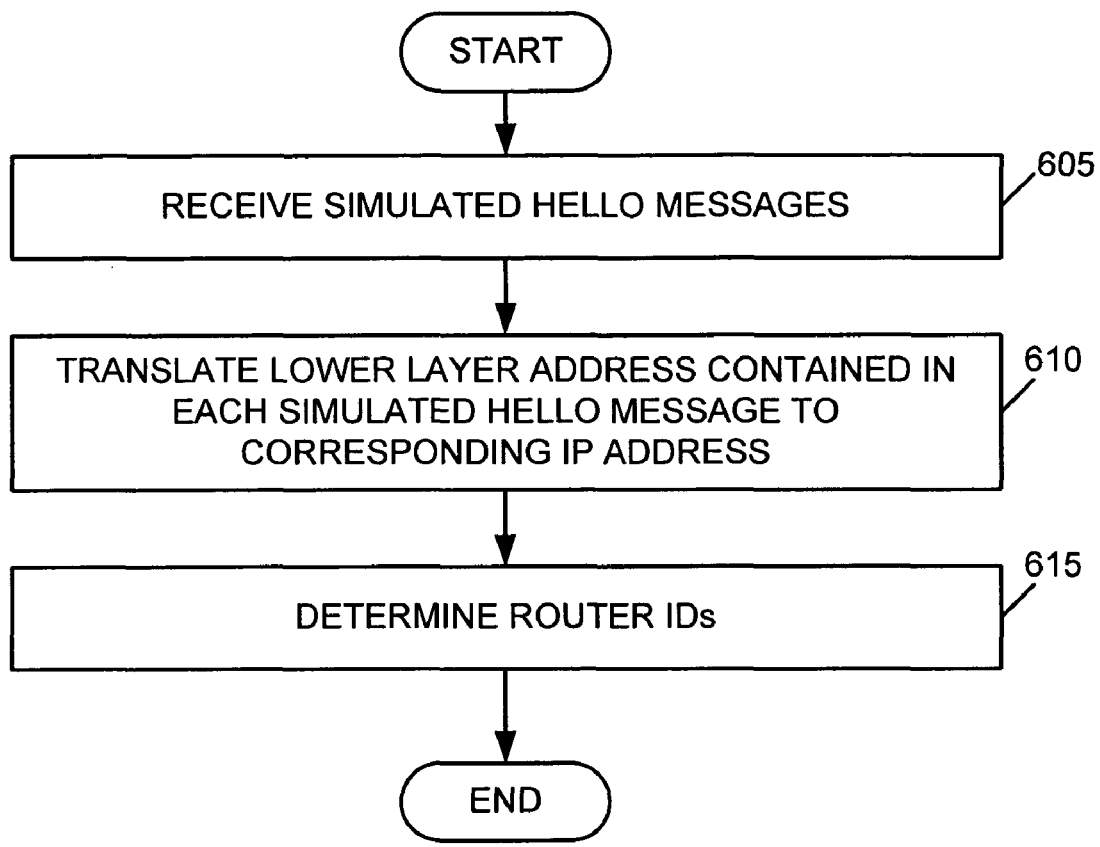
FIG. 6 is a flow chart that illustrates an exemplary process, consistent with the present invention, for acquiring a connectivity graph at a standard area router in the network of FIG. 1.

FIG. 6 is a flow chart that illustrates an exemplary process, consistent with the present invention, for acquiring a connectivity graph at a standard area router 120 of network 105. The acts of the exemplary process of FIG. 6 provide further detail to act 505 of FIG. 5.

The exemplary process may begin with the receipt of simulated HELLO messages [act 605]. Simulated HELLO messages may be generated by a private routing protocol internal to sub-network 105 and may include, for example, data specifying the type of node represented by the simulated HELLO, the lower layer address of the node's interface onto sub-network 105, and a cost of the remote node from router 120. A private routing protocol may generate a simulated HELLO message representing each router 120 in sub-network 105 every HELLOINTERVAL seconds, where HELLOINTERVAL is a parameter that specifies an exact periodic interval for sending the HELLO messages. HELLOINTERVAL need not be the same for every router and may change dynamically. Alternatively, the private routing protocol may generate a simulated HELLO message representing a router 120 in sub-network 105 in response to some event, such as receipt of a routing update through the private routing protocol.

Figure 7:
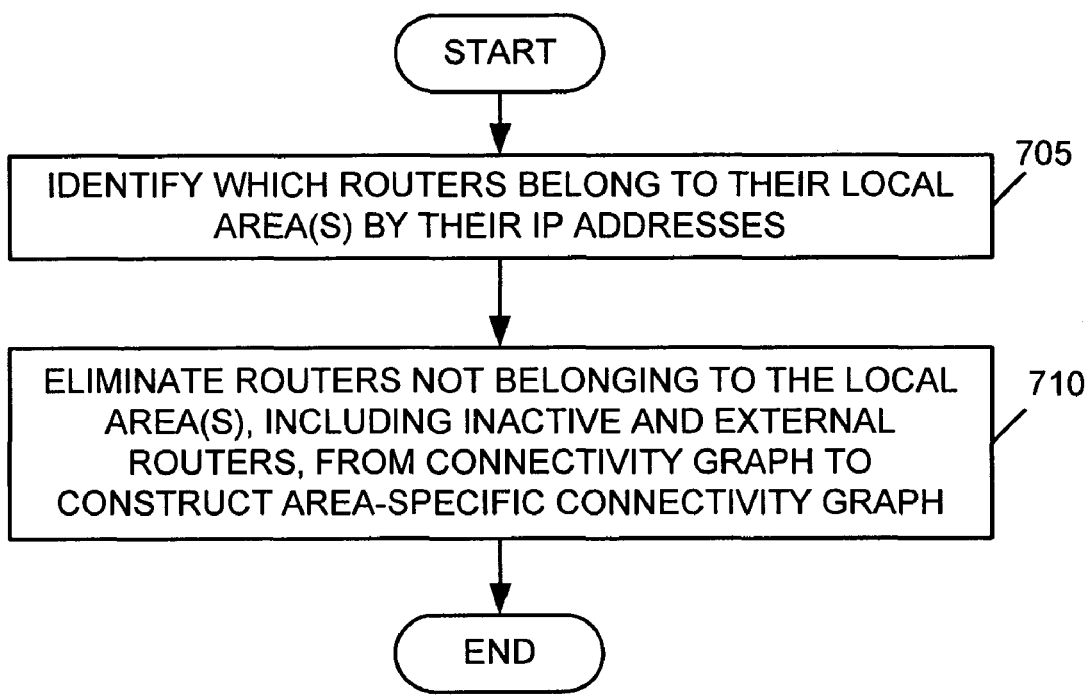
FIG. 7 is a flow chart that illustrates an exemplary process, consistent with the present invention, for acquiring an area-specific connectivity graph at a standard area router in the network of FIG. 1.

A lower layer address contained in each received simulated HELLO message may be translated into a corresponding Internet Protocol (IP) address [act 610]. This translation may be performed by a mechanism, such as, for example, Ethernet address resolution protocol (ARP). The OSPF Router ID corresponding to each such address in the current area may then be determined [act 615]. The OSPF Router ID associated with each router 120 in sub-network 105 that may be included in the connectivity graph may be determined from OSPF link-state advertisement packets, database description packets, link-state request packets, or other OSPF protocol packets received at a respective router 120. EXEMPLARY STANDARD AREA ROUTER AREA-SPECIFIC CONNECTIVITY GRAPH CONSTRUCTION PROCESS FIG. 7 is a flow chart that illustrates an exemplary process, consistent with the present invention, for constructing an area specific connectivity graph at a standard area router 120. The acts of the exemplary process of FIG. 7 provide further detail to act 510 of FIG. 5.

The exemplary process may begin with the identification of the routers that belong to router 120's local area(s) by their IP addresses [act 705]. Each area may correspond to a distinct address range, which may be defined by a static configuration table. A standard area router may look up the IP address of another router's interface on sub-network 105 to determine the area to which it is assigned. Likewise, all mobile leaf routers may be assigned to a distinct address range. A given router may also belong to two or more areas. In such a case, it may have two or more IP addresses assigned to its interface onto sub-network 105, one in each area.

Figure 8:
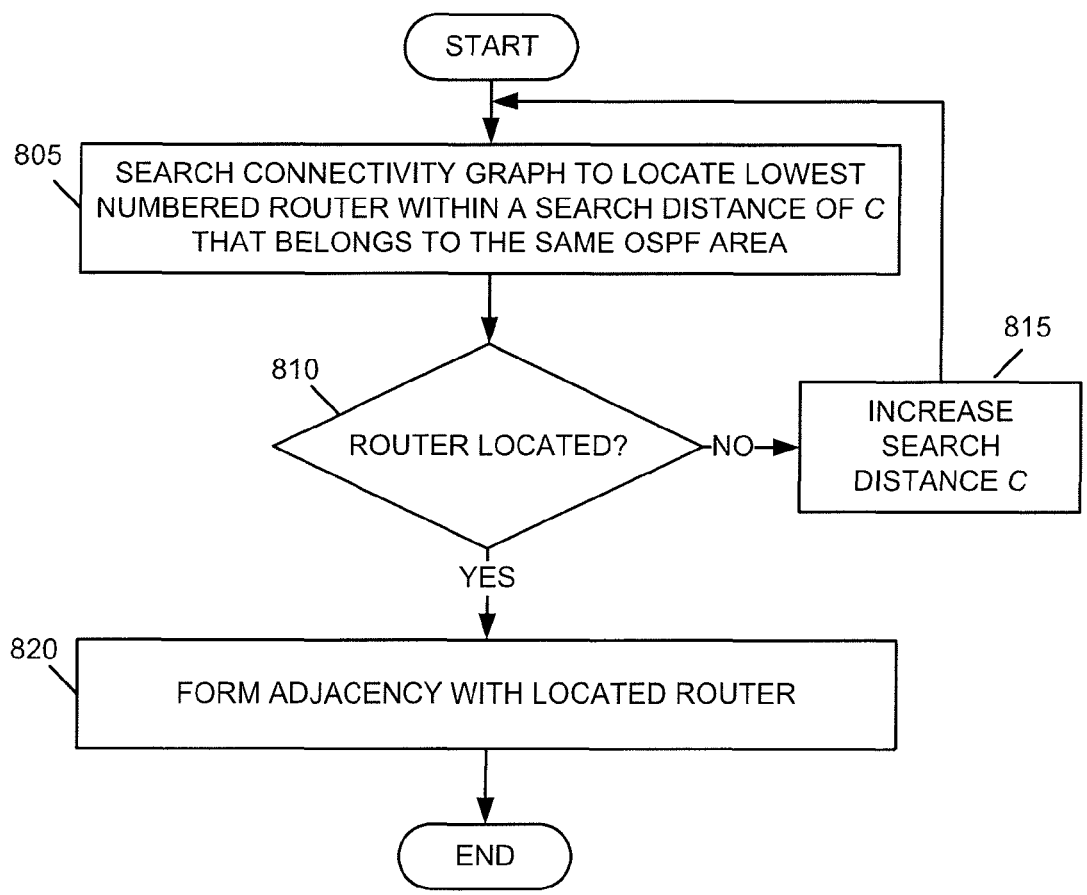
FIG. 8 is a flow chart that illustrates one exemplary process for constructing an adjacency graph consistent with one implementation of the invention.

Routers not belonging to the local area(s) may be eliminated from the connectivity graph to construct an area-specific connectivity graph [act 710]. In particular, inactive, area-external nodes, and mobile leaf routers do not belong to any OSPF area and so may be eliminated from the connectivity graph. Routers identified by a flag in their simulated HELLO messages as being not active may be eliminated from the connectivity graph. Additionally, routers belonging to a different area, and mobile leaf routers, may be eliminated from the connectivity graph (i.e., a network graph that includes vertices at each router and edges between each vertex). Routers may be eliminated from the connectivity graph by first considering a set of all the vertices adjacent to the vertex to be eliminated (i.e., the vertex corresponding to the router to be eliminated). The vertex to be eliminated and all edges leading to it may be deleted from the graph. Then, new edges may be inserted connecting all vertices to which the deleted vertex had previously been adjacent, and assigned costs equal to the sum of the costs along the two edges that it replaces. This process may be repeated until all such vertices have been eliminated. EXEMPLARY SHORTEST-PATH FOREST, WITH EXPANDING RING SEARCH, ADJACENCY GRAPH CONSTRUCTION PROCESS FIG. 8 is a flow chart that illustrates an exemplary process, consistent with the present invention, for constructing an adjacency graph at a router 120 of sub-network 105. The acts of the exemplary process of FIG. 8 provide further detail to act 515 of FIG. 5 consistent with one implementation of the invention. The exemplary process of FIG. 8 results in the construction of a "spanning forest," with each tree in the forest including a shortest-path tree. Each tree in the spanning forest may be rooted at a lowest-numbered router in sub-network 105.

Figure 9A:
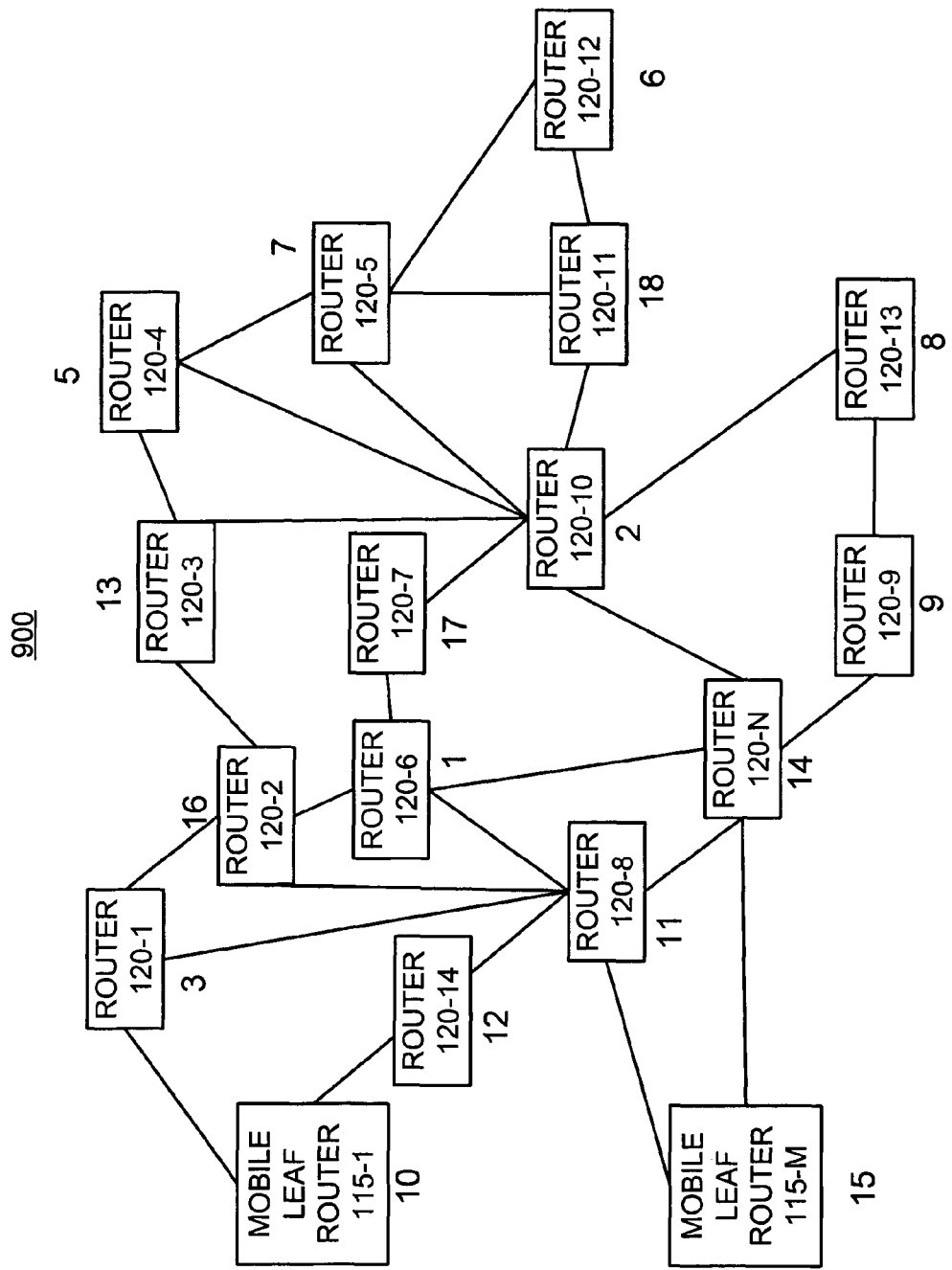
FIGS. 9A-9C graphically illustrate the exemplary process of FIG. 8.
Figure 9B:
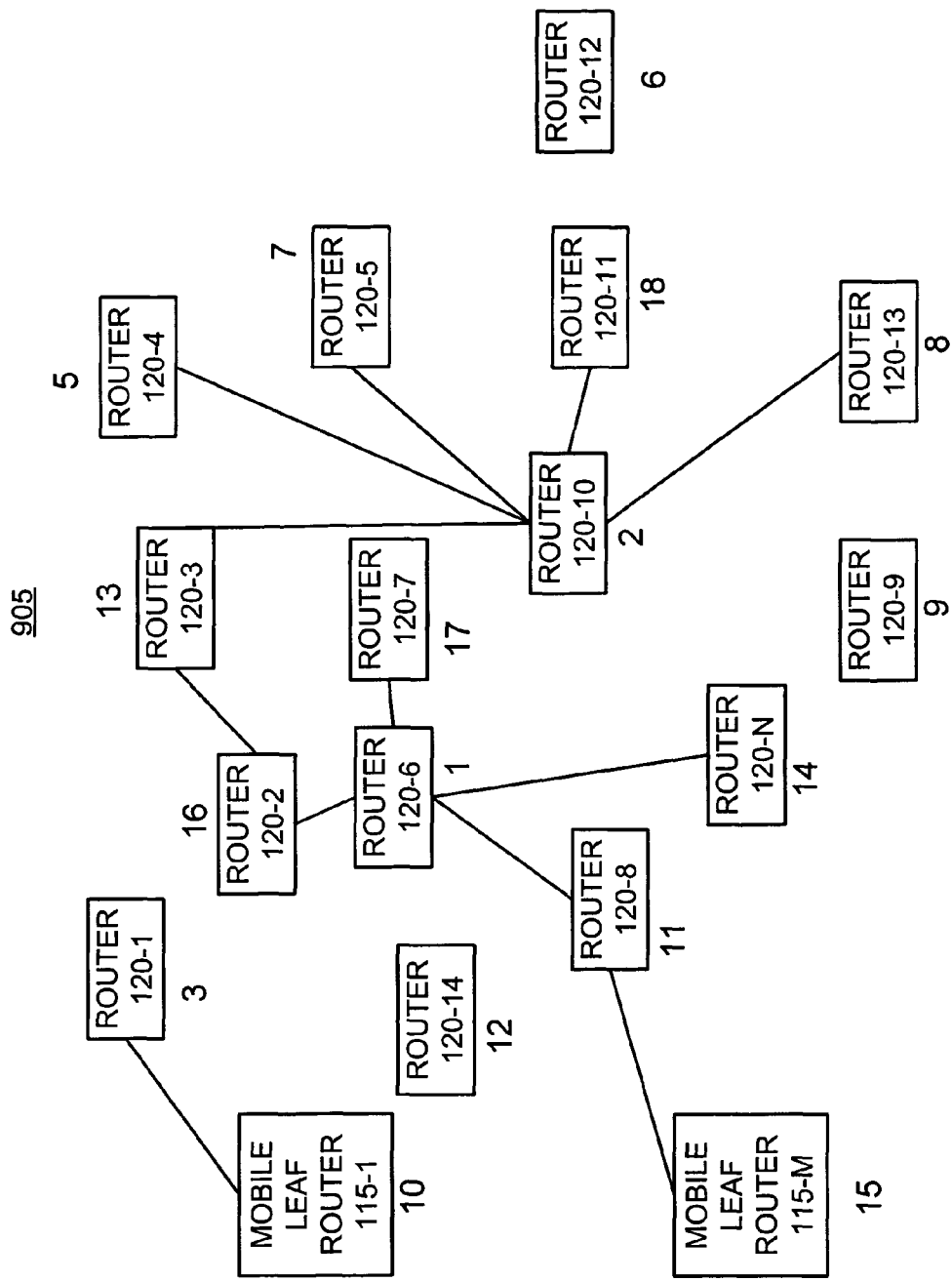

The exemplary process may begin with the location of a lowest numbered router within a search distance of C that belongs to the same OSPF area as router 120 [act 805]. FIG. 9A illustrates an area-specific connectivity graph 900, with the router identification (ID) numbers, associated with each router 115 or 120, identified. A determination may then be made whether the lowest numbered router within the search distance C is located [act 810]. Initially, for example, C may be equal to a value $C_i$. If a lowest numbered router within the search distance of C is not located, then the search distance C may be increased [act 815], and the exemplary process may return to act 805. C, with a value equal to $C_i$, for example, may be increased to a value $C_{i+1}$. Acts 805-815 may be iteratively repeated until a lowest numbered router within the search distance C is located, or until the search distance C encompasses the entire connectivity graph. FIG. 9B illustrates an adjacency graph 905, corresponding to the connectivity graph of FIG. 9A, after completion of an initial search distance $C_i$ (i.e., completion of a first "ring"). As shown in FIG. 9B, each router has formed an adjacency with the lowest-numbered router with a distance of $C_i$ (e.g., one hop in this example). Adjacency graph 905, at this stage, includes a disconnected spanning forest, with shortest-path trees rooted at router ID numbers 1, 2, 3, 6 and 9.

Figure 9C:
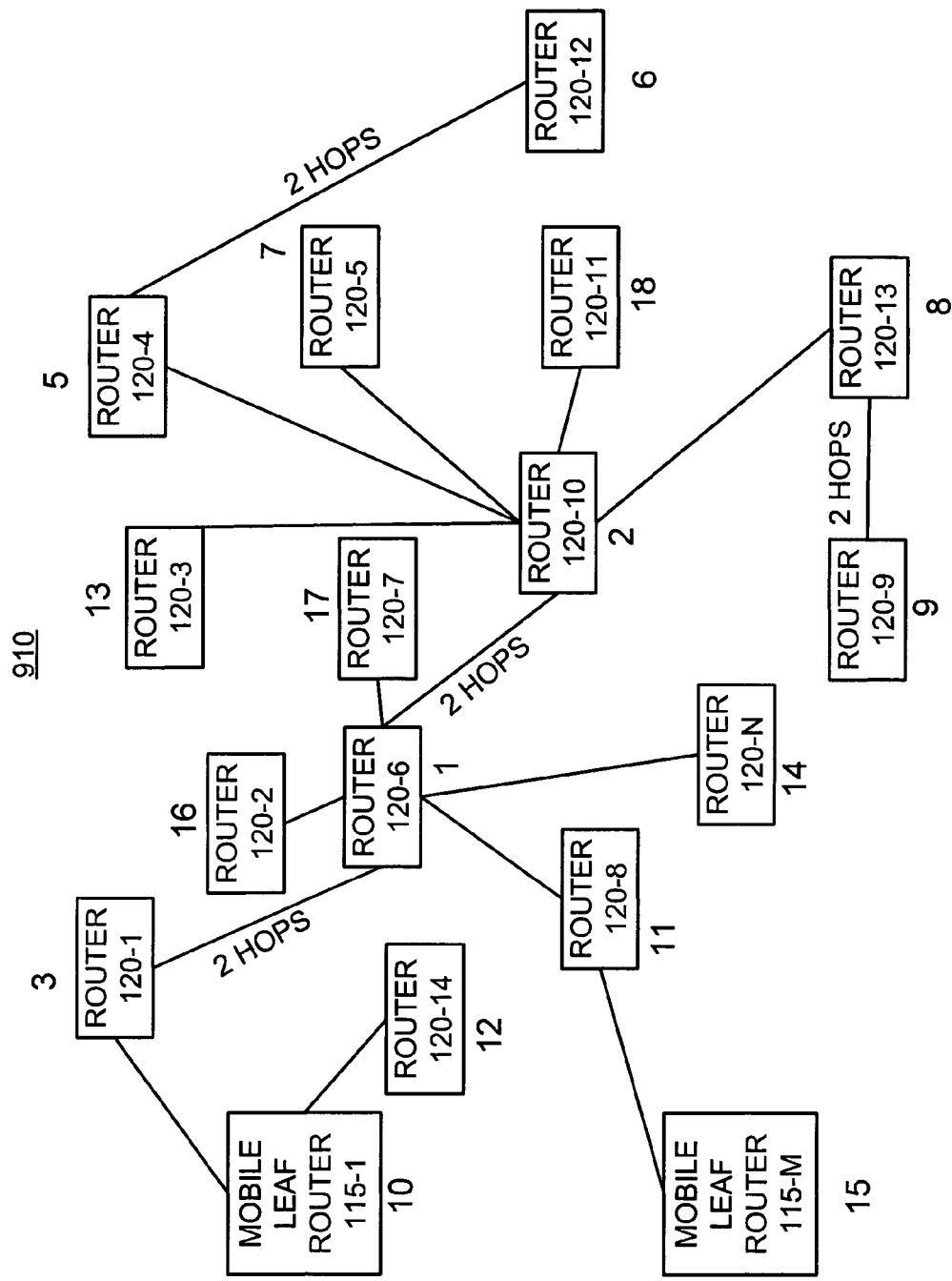

If a lower-numbered router with distance C cannot be found, then router 120 may include the root of one of the trees of a spanning forest. If the lowest numbered router within the search distance C is located, then an adjacency may be formed with the located router [act 820]. The adjacency formed with the located router may span a link that is more than one hop in length. FIG. 9C illustrates an adjacency graph 910, corresponding to the connectivity graph of FIG. 9A, after completion of a search through the entire connectivity graph. In FIG. 9C, those routers that could not find a lower-numbered router in their vicinity have expanded their search distance to two hops, and formed an adjacency with the lowest-numbered router within that distance. As shown in FIG. 9C, the only router that could not find a lower-numbered router within two hops is router ID 1. Router ID 1 continues to expand its search distance until the distance encompasses the entire connectivity graph. At that point, router ID 1 can find no lower-numbered router than itself, and the process terminates at router ID 1, with router ID 1 as a root of the spanning tree.

The exemplary process above results in a tree rooted at the lowest-numbered router in sub-network 105 and including every node in sub-network 105. In other implementations, the spanning tree may be rooted at the highest-numbered router. Alternatively, any well-defined ordering of the routers (e.g., an ordering obtained by permuting the bits in the router IDs) may be used. Furthermore, two or more orderings could be employed in parallel to create an adjacency graph that was better connected.

Exemplary Distance-Based Clustering Adjacency Graph Construction Process

Figure 10:
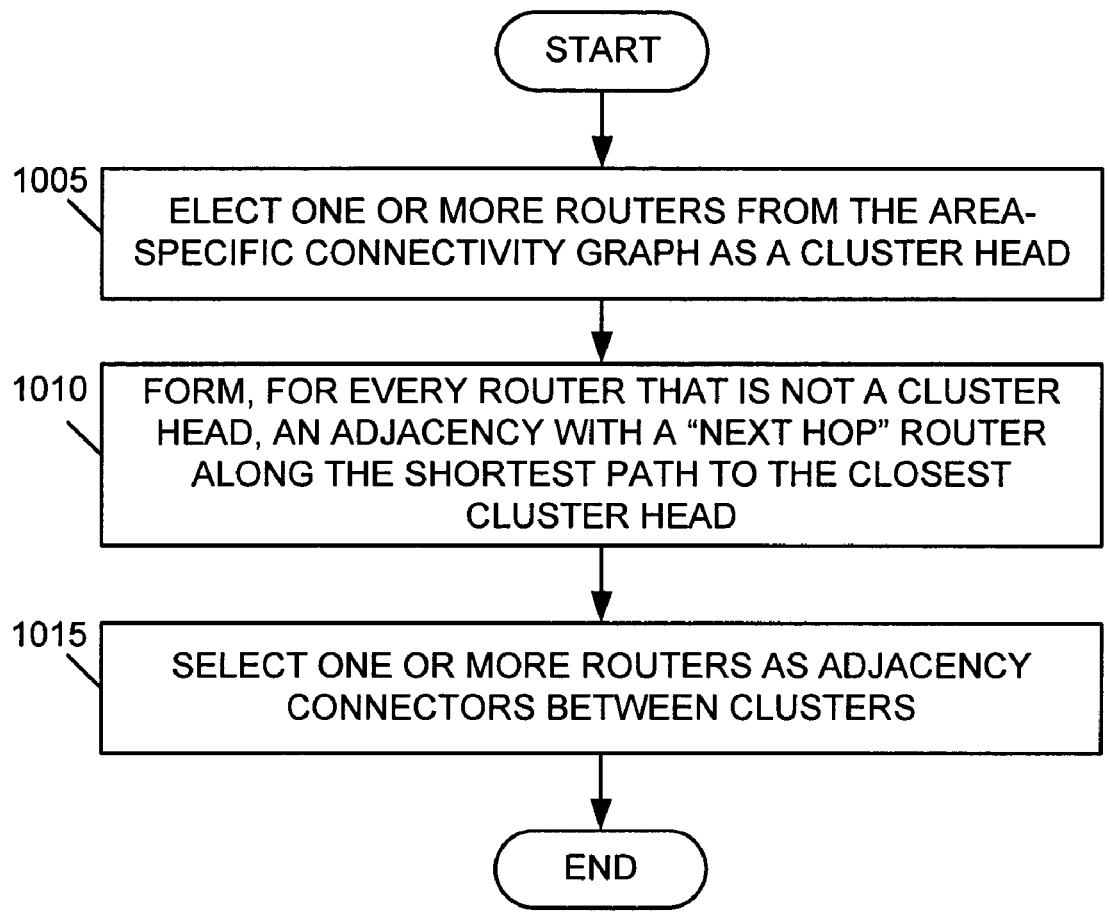
FIG. 10 is a flow chart that illustrates another exemplary process for constructing an adjacency graph consistent with another implementation of the invention.

FIG. 10 is a flow chart that illustrates an exemplary process, consistent with the present invention, for constructing an adjacency graph at a router 120 of sub-network 105. The acts of the exemplary process of FIG. 10 provide further detail to act 515 of FIG. 5 consistent with a further implementation of the invention. The exemplary process of FIG. 10 imposes a clustered hierarchical structure on the connectivity graph to construct the adjacency graph.

The exemplary process may begin with the election of one or more routers from the area-specific connectivity graph as a "cluster head" [act 1005]. Each "cluster head" may serve as a root, or "head," for a cluster of other routers in sub-network 105. A number of techniques may be used for electing one or more routers as a cluster head, including the exemplary process described below with respect to FIGS. 11-13. FIG. 14A illustrates an exemplary connectivity graph 1400 in which routers 120-8 and 120-10 have been elected as cluster heads (CHs) 1405 and 1410, respectively.

Every router that is not a cluster head may then form an adjacency with a "next hop" router along the shortest path to the closest cluster head [act 1010]. One or more routers may then be selected as adjacency connectors between clusters [act 1015]. In one implementation, the cluster heads themselves may be selected as the adjacency connectors. In another implementation, each router builds a list of cluster heads in its vicinity. For each pair of clusters, it builds a list of intermediate routers (including itself) between its cluster head, and each of the other cluster heads. Each router may then compute the path length through each of the cluster heads. The direct path, linking the two cluster heads directly, may be included if it exists. Each router then orders the list by distance. If the router itself is one of the intermediate routers, then it establishes a second adjacency between itself and the first hop towards the second cluster head.

Figure 14A:
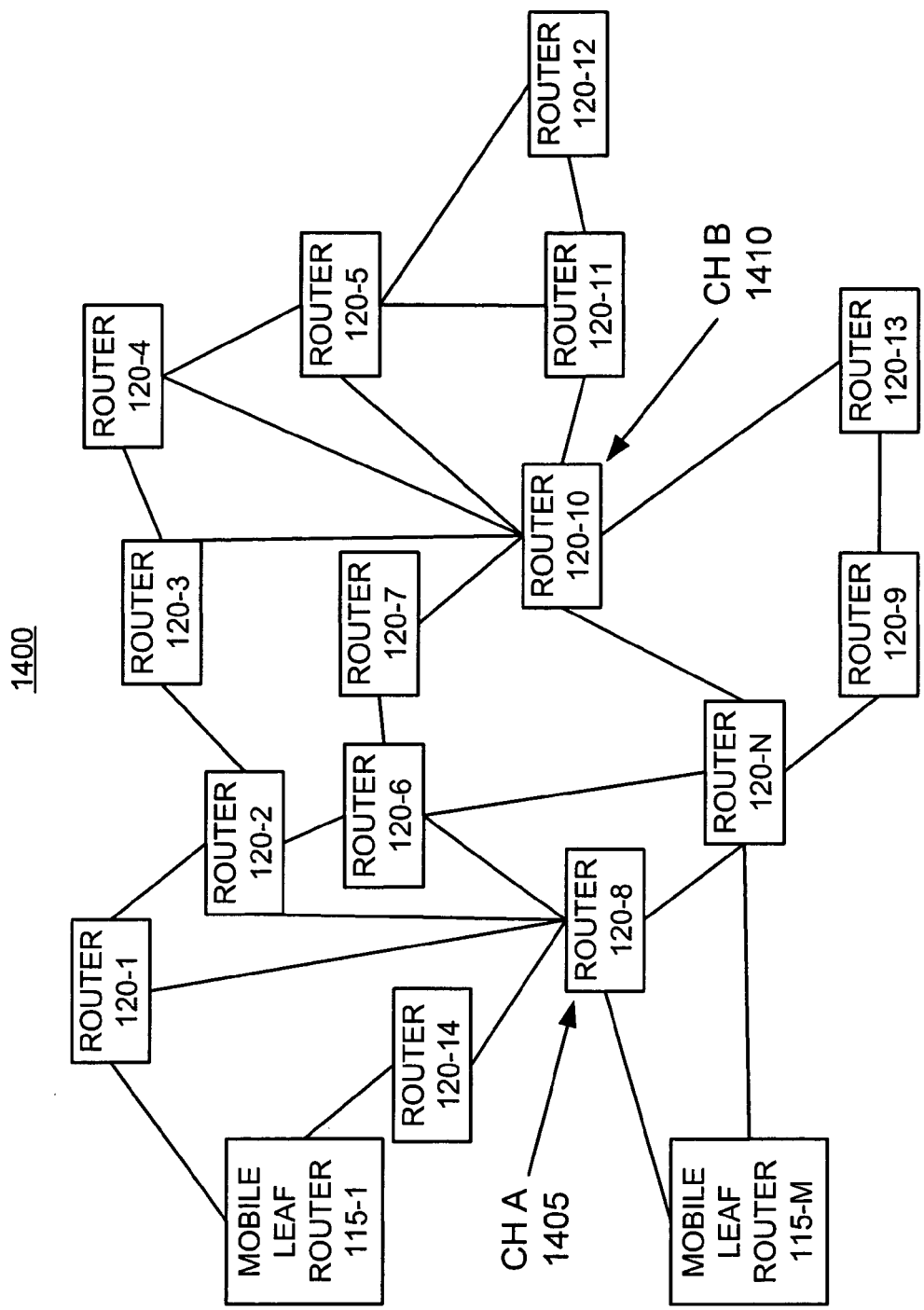
FIGS. 14A and 14B graphically illustrate the exemplary process of FIG. 10.
Figure 14B:
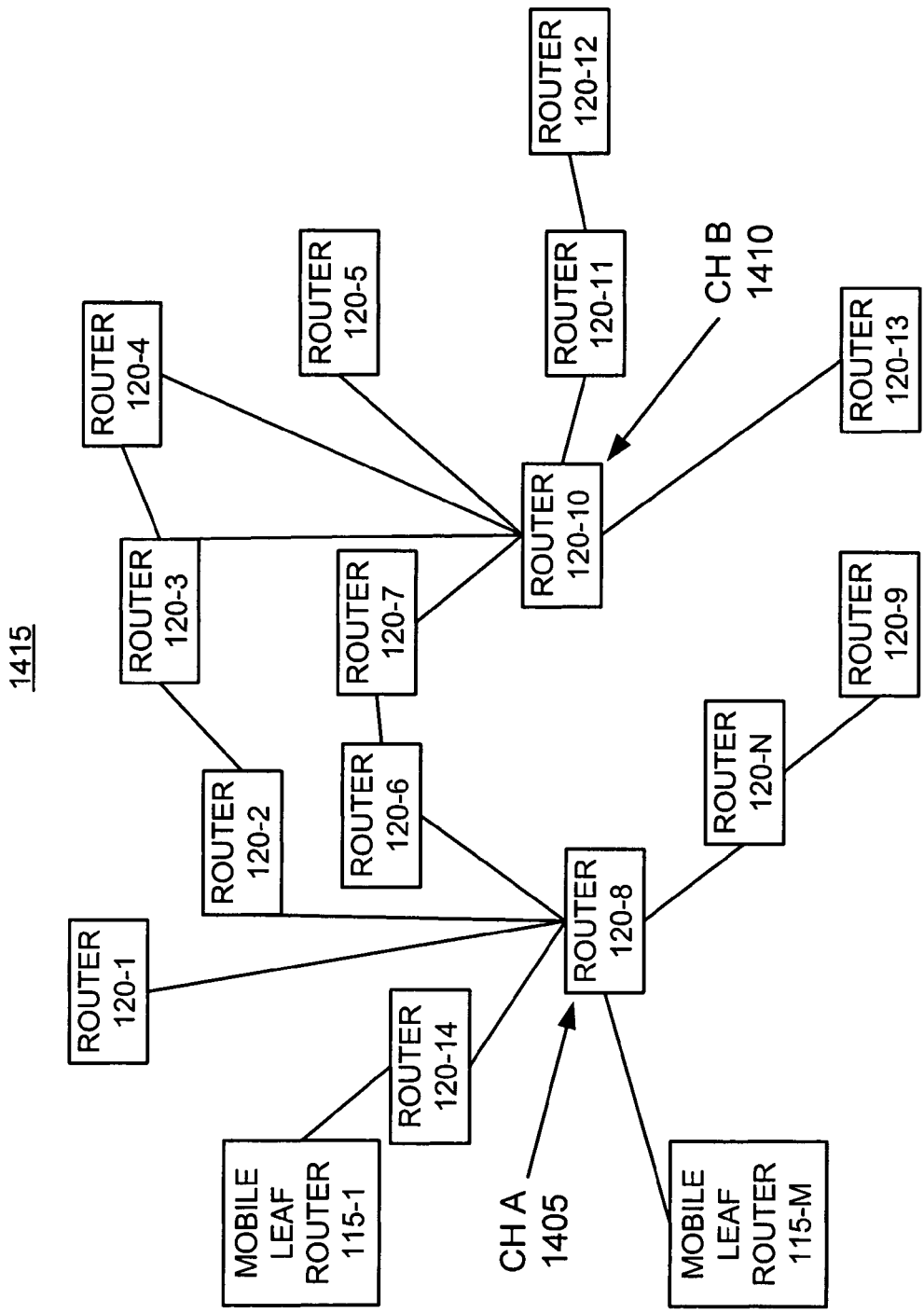

FIG. 14B illustrates an exemplary adjacency graph 1415, corresponding to the connectivity graph of FIG. 14A, that depicts the effect of forming adjacencies with cluster heads and the establishment of connecting adjacencies between the clusters. Each edge in FIG. 14B represents an OSPF adjacency along which routing advertisements may be flooded.

Exemplary Cluster Head Election Process

Figure 11:
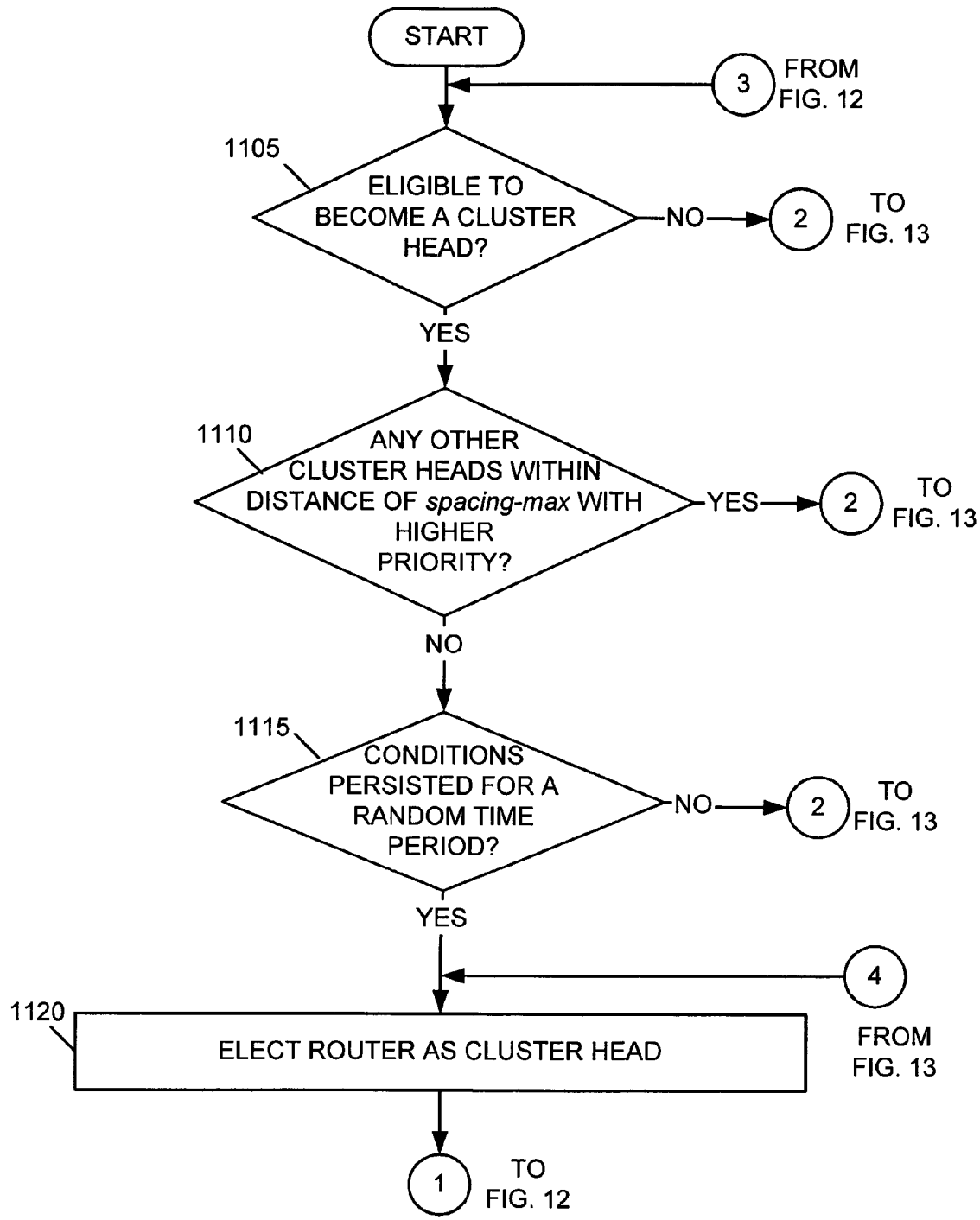
FIGS. 11-13 are connected flow charts that illustrate an exemplary process, corresponding to act 1005 of FIG. 10, for electing a router as a cluster head.
Figure 12:
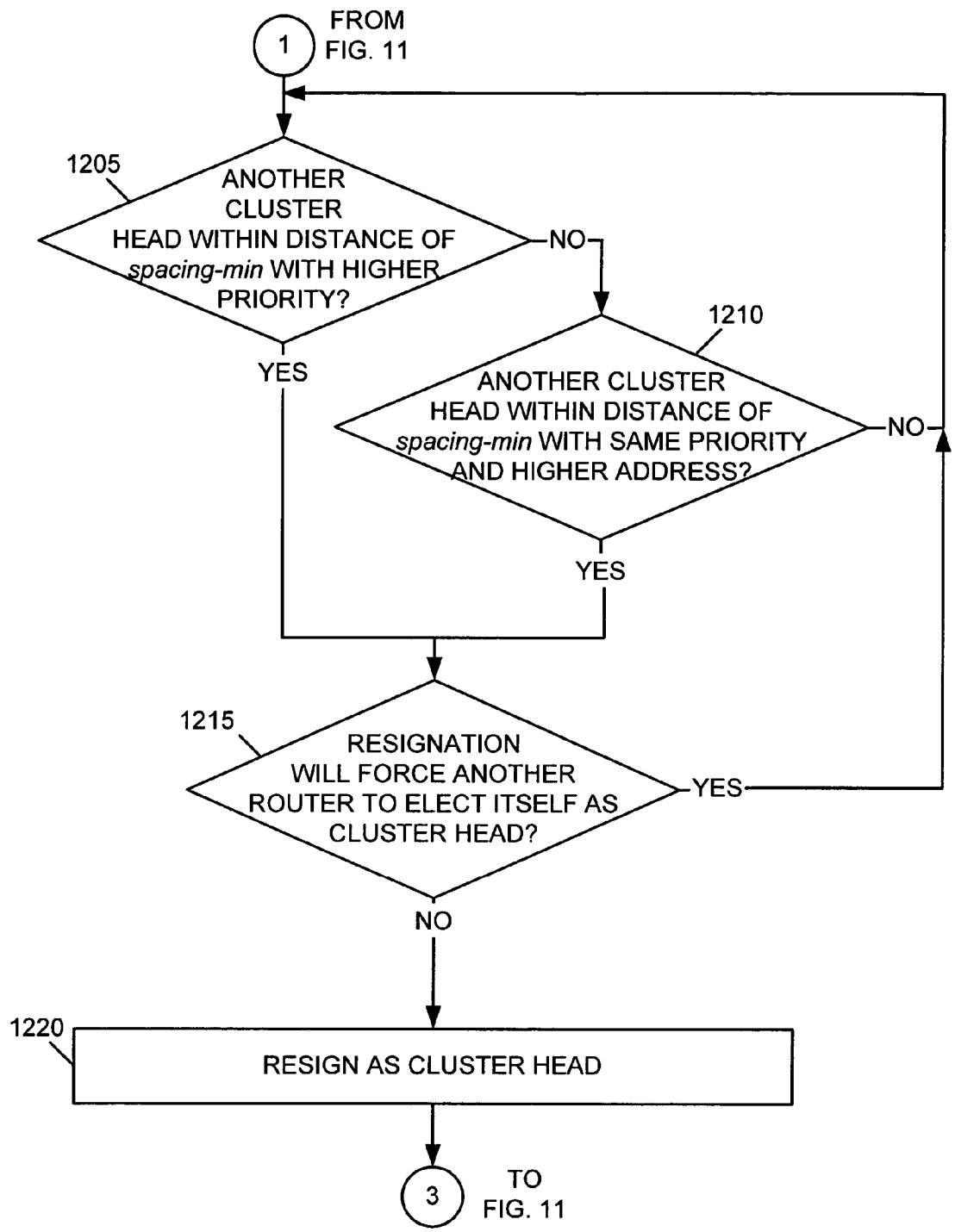
Figure 13:
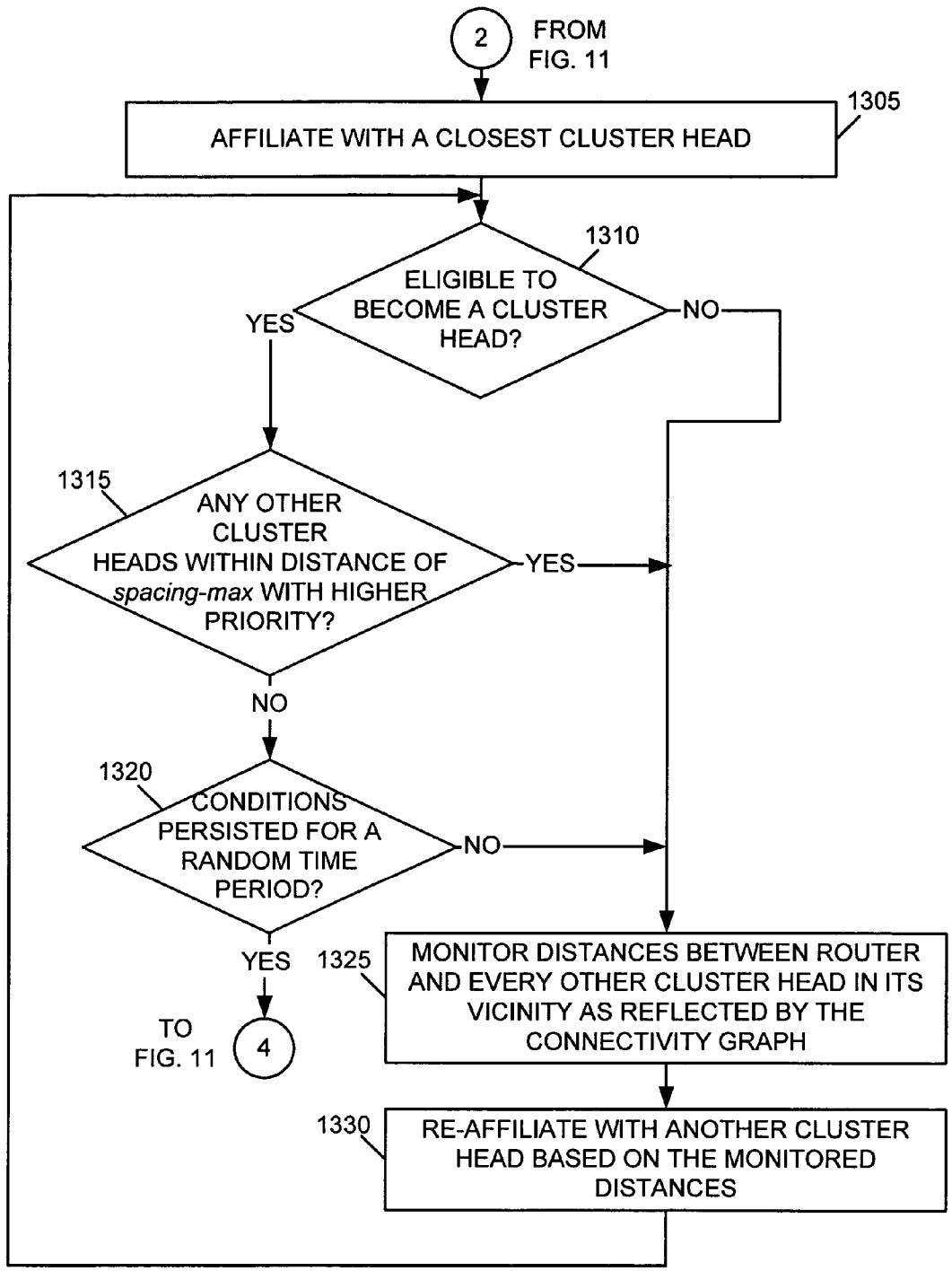

FIGS. 11-13 are interconnected flow charts that illustrate one exemplary process, consistent with the present invention, for electing a router 120 as a "cluster head" in the distance-based clustering adjacency graph construction process of FIG. 10. The acts of the exemplary process of FIGS. 11-13 provide further detail to one exemplary implementation of act 1005 of FIG. 10.

The exemplary process may begin with a determination whether router 120 is eligible to become a cluster head (CH) [act 1105]. Routers may be assigned a priority for election as a cluster head. For example, two special priority values may be reserved: never (=0) and always (=255). A router assigned a priority of never may never be eligible for election as a cluster head. A router assigned a priority of always may always elect itself as a cluster head. Priority values between never and always indicate that the router may be chosen as a cluster head, with the priority indicated. If router 120 is not eligible to become a cluster head, then the exemplary process may continue at act 1305 below. If router 120 is eligible to become a cluster head, then router 120 may determine if any other CHs are located within a distance of spacing-max of router 120 and have a higher priority [act 810]. Router 120 can determine what other routers are cluster heads, and their priority, from beacons that those cluster heads broadcast or multicast using facilities provided by the internal routing protocol private to network 105; and it can determine its distance from those cluster heads from the connectivity graph. spacing-max may include a value indicating a maximum distance CHs should be apart. For example, spacing-max may equal 3 hops in some implementations. If other CHs are located within a distance of spacing-max of router 120 and have a higher priority, the exemplary process may continue at act 1305 below. If no other CHs are located within a distance of spacing-max of router 120, or don't have a higher priority, then a determination may be made whether conditions in acts 1105 and 1110 have persisted for a random time period [act 1115]. If not, the exemplary process may continue at act 1305 below. If so, then router 120 may be elected as a cluster head [act 1120]. While it is a cluster head, router 120 may periodically broadcast beacons identifying itself as such to all other routers in network 105, using broadcast or multicast mechanisms provided by the private routing protocol internal to network 105. These beacons identify it as a cluster head, and specify its priority. Alternatively, if the private routing protocol provides a reliable broadcast or multicast mechanism, then router 120 may send only a single non-repeated beacon identifying itself as a cluster head and specifying its priority.

Once it has been elected as a cluster head, router 120 may determine whether another CH, with higher priority, is located within a distance of spacing-min of router 120 [act 1205, FIG. 12]. spacing-min may include a value indicating a minimum distance CHs should be apart. For example, spacing-min may equal 2 hops in some implementations. Router 120 can determine what other routers in its vicinity in sub-network 105 have declared themselves to be cluster heads from the beacons broadcast, or multicast, by each cluster head to its neighbors through mechanisms provided by the internal routing protocol private to sub-network 105, and router 120 can determine what routers in its vicinity have declared themselves to be cluster heads, by monitoring these beacons. If another CH, with higher priority, is not located within a distance of spacing-min of router 120, router 120 may determine whether another CH is located within a distance of spacing-min with a same priority and a higher network address [act 1210]. If not, the exemplary process may return to act 1205. If router 120 determines that either another CH is located within a distance of spacing-min of router 120 and has a higher priority, or another CH is located within a distance of spacing-min of router 120 with a same priority and a higher address, then router 120 may determine whether resigning as a cluster head will force another router to elect itself as a cluster head [act 1215]. If not, router 120 may resign as a cluster head [act 1220] and the exemplary process may continue at act 1105. If router 120 determines that resigning as a cluster head will force another router to elect itself as a cluster head, then router 120 may not resign as a cluster head and the exemplary process may return to act 1205.

If any of the three conditions of acts 1105, 1110 or 1115 above were not met, then router 120 may affiliate with a closest cluster head router [act 1305, FIG. 13]. Router 120 may determine which routers are cluster heads from the beacons that they have broadcast to other routers in network 105. Router 120 may determine the closest cluster head router from information contained in the connectivity graph constructed by simulated HELLOs from the private, internal routing protocol of network 105. This distance information may be modified, for example, by other configured information so as to establish a preference for affiliation with particular routers. Router 120 may affiliate with a cluster head router by forming an adjacency with the "next hop" router along the shortest path to the cluster head. It may then use that adjacency for the exchange of routing information.

While it is affiliated with a cluster head, router 120 may intermittently check to see if it should reaffiliate with a different cluster head, or promote itself to the status of cluster head. It may do so either periodically, or in response to some event, such as a change in the topology of network 105 as reported via simulated HELLO messages and represented by a change in the connectivity graph. To do so, router 120 may determine whether it is eligible to become a cluster head [act 1310]. If so, router 120 may determine whether any other CHs are within a distance of spacing-max of router 120 with a higher priority [act 1315]. If not, then router 120 may determine whether the conditions of acts 1310 and 1315 have persisted for a random time period [act 1320]. If the conditions have persisted for the random time period, then router 120 should promote itself to cluster head and the exemplary process may continue at act 1120. If not, the exemplary process may continue at act 1325.

Returning to act 1315, if router 120 determines that other CHs are within a distance of spacing-max of router 120 with a higher priority, router 120 may check to see if it should reaffiliate with one of these other CHs. To prevent bouncing back and forth among different CHs, router 120 should not reaffiliate simply because it is now closer to some other CH, but rather should apply a hysteresis check. To do so, router 120 may monitor distances between itself and every other cluster head router in its vicinity, as reflected by the connectivity graph [act 1325], over time. For example, let $c_i$ be router 120's cost to the $i^{th}$ cluster head router, and c be the cost to router 120's current cluster head router (both c and $c_i$ may change with time). The time-integral of the advantage ($C_{advantage}$) of switching to a different cluster head router may be computed by the following relation, where the limits of integration (not shown) include an appropriate time interval (e.g., $t_1$ to $t_2$):

$$C_{advantage} = \int \max_i ((c(t) - c_i(t)) dt \qquad \text{Eqn. (1)}$$

Router 120 may then re-affiliate with another cluster head based on the monitored distances [act 1330]. For example, if $C_{advantage}$ exceeds a configurable threshold value, then router 120 may re-affiliate with the corresponding cluster head, which is now closest. These costs $c_i$ may be adjusted, for example, by configurable values, so as to create a preference for router 120 to affiliate with particular cluster head routers.

Exemplary Numeric Ordering Rule Adjacency Formation Process

Figure 15:
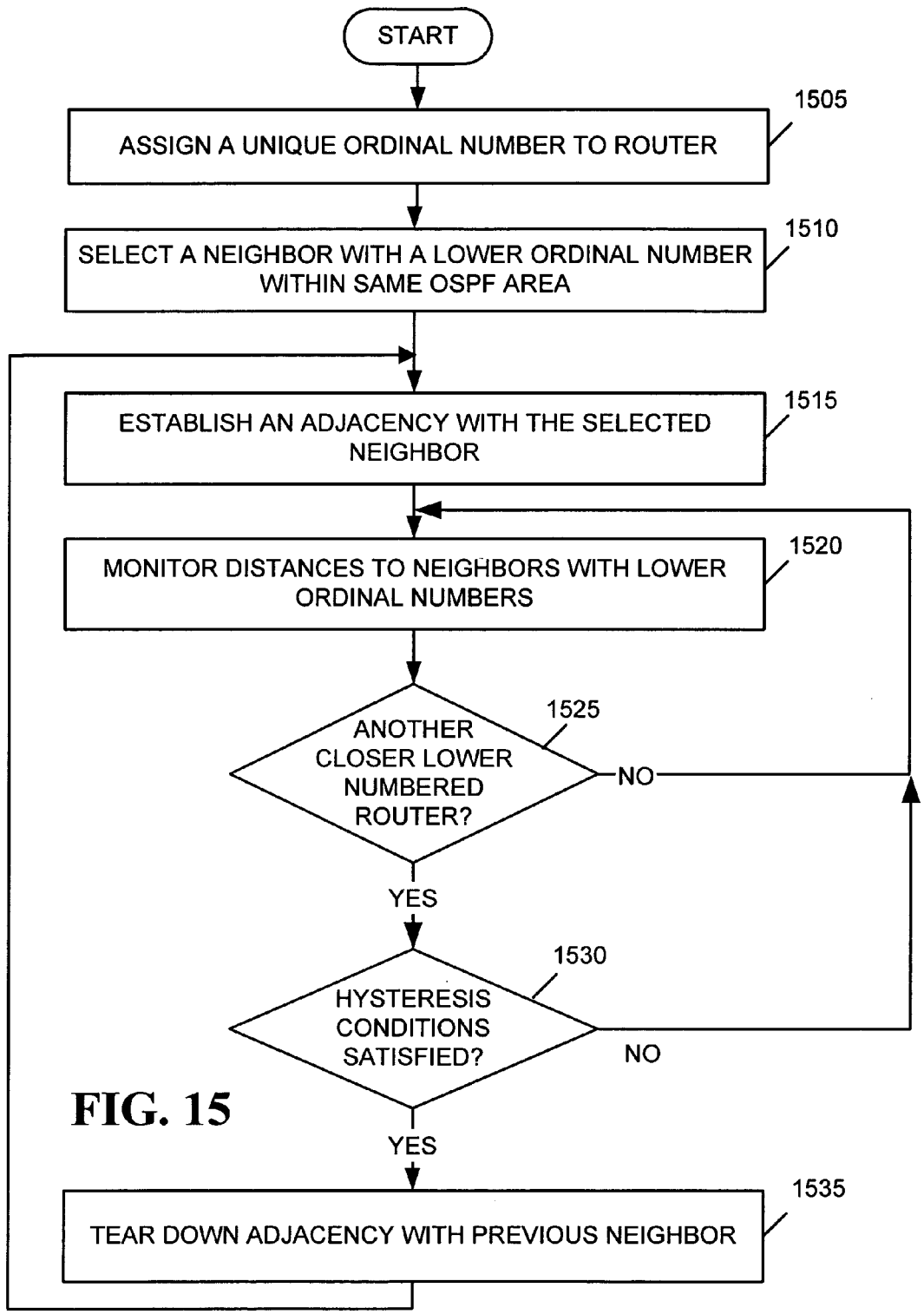
FIG. 15 is a flow chart that illustrates an exemplary process for constructing an adjacency graph consistent with a further implementation of the invention.

FIG. 15 is a flow chart that illustrates another exemplary process, consistent with the present invention, for constructing an adjacency graph at each router 120 of sub-network 105 using numeric ordering. The acts of the exemplary process of FIG. 15 provide further detail to act 515 of FIG. 5 consistent with a further implementation of the invention. The exemplary process of FIG. 15 imposes a numeric ordering relationship on the connectivity graph to construct the adjacency graph.

The exemplary process may begin with the assignment of an ordinal number to router 120 [act 1505]. Each router 120 in sub-network 105 may also be assigned an ordinal number to establish an ordered relationship among the routers. This ordinal number may be a router identification number, an address of the router, or any other convenient value, as long as it is unique for each router and leads to an ordering of the routers in sub-network 105. A neighbor of router 120, with a lower ordinal number and within the same OSPF area, may be selected [act 1510]. Selection of a neighbor with a lower ordinal number may ensure creation of a tree rooted at the lowest numbered router in network 105. In one implementation, the closest lower-numbered router may be chosen for maximum efficiency in the distribution of routing information. Router 120 may then establish an adjacency with this neighbor [act 1515]. Establishment of an adjacency with the neighbor may include the synchronization of routing databases between router 120 and the neighbor. Synchronization of routing databases may be performed using the standard OSPF mechanisms described in RFC 2328=STD 54. Alternatively, synchronization of routing databases may include the "database digest" technique described in co-pending U.S. patent application Ser. No. 10/797,030, entitled "Systems and Methods for Synchronizing Multiple Copies of a Database Using Database Digests." Other routing database synchronization techniques, however, may alternatively be employed.

After establishing an adjacency with its lower-numbered neighbor, router 120 may monitor the distance to each of its neighbors as specified in the connectivity graph [act 1520]. If router 120 determines that some other lower-numbered neighbor has become closer, it may select the closer lower-numbered neighbor as the neighbor with which to form an adjacency [act 1525]. It need not form this adjacency with the now closer lower-numbered neighbor immediately, as the adjacency graph is guaranteed to be connected regardless of the lower-numbered neighbor chosen; but it should switch eventually, in order to maximize efficiency. For this reason, it should determine if hysteresis conditions are satisfied to further determine when to switch to the closer lower-numbered neighbor [act 1530]. For instance, a hysteresis test similar to that of Eqn. 1 above may be applied. When router 120 decides to switch, it may teardown the adjacency that is no longer needed [act 1535] and form a new adjacency with the now closer lower-numbered neighbor [act 1515].

As will be appreciated, the same technique could be applied using the higher-numbered neighbor instead. Indeed, the same technique could be applied using both the lower-numbered and higher-numbered neighbor, so that every router (except the highest and lowest numbered) would always form at least two adjacencies: one with a higher-numbered neighbor, and one with a lower-numbered neighbor.

Exemplary Mobile Leaf Router Adjacency Formation Process

Figure 16:
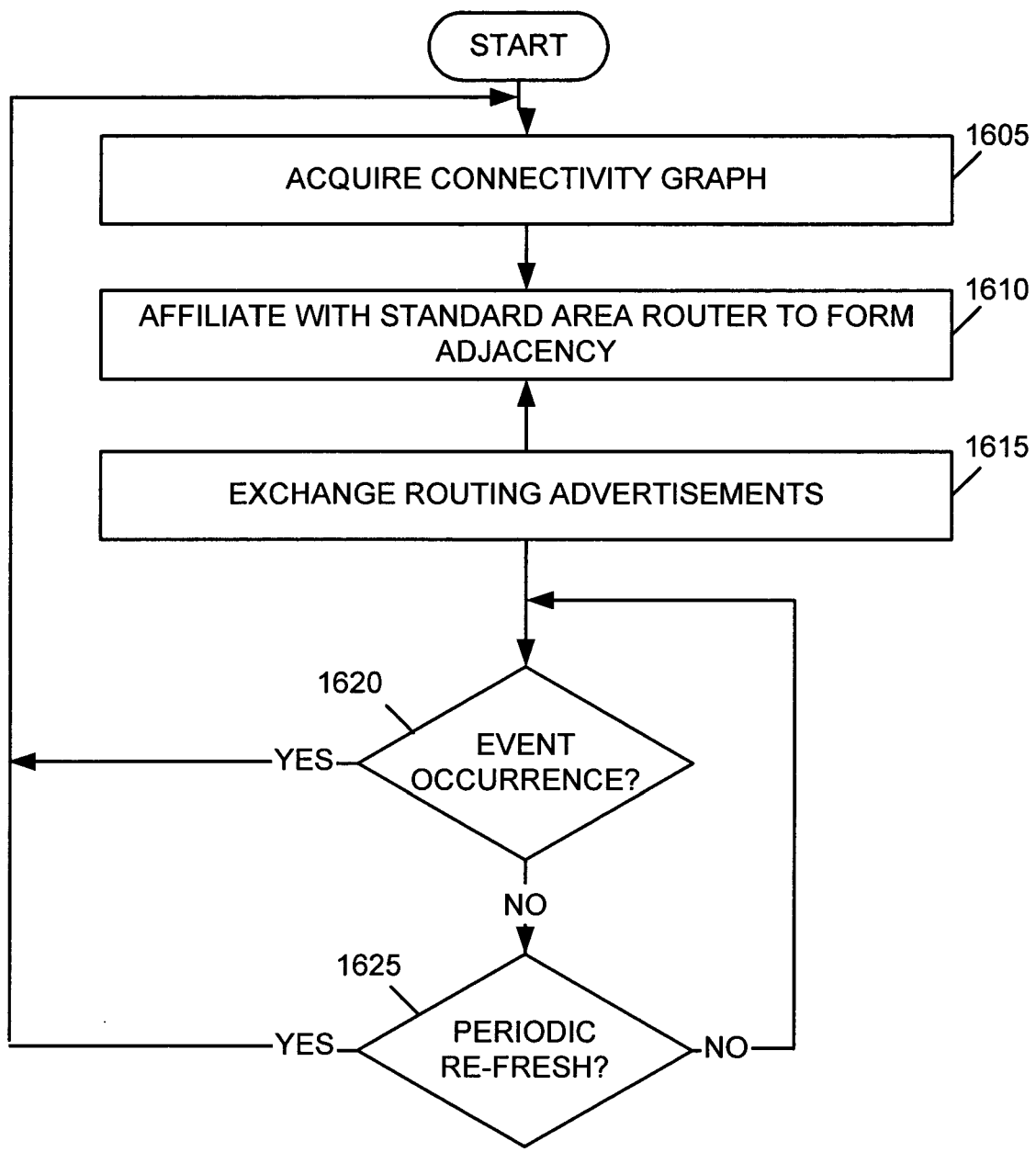
FIG. 16 is a flow chart that illustrates an exemplary process, consistent with the present invention, for a mobile leaf router to form an adjacency with a standard area router of sub-network 105 of FIG. 1.

FIG. 16 is a flow chart that illustrates an exemplary process, consistent with the present invention, for forming an adjacency with a standard area router, or another mobile leaf router, at a mobile leaf router 115 within network 100.

The exemplary process may begin with the acquisition of a connectivity graph by the mobile leaf router 115 [act 1605]. The connectivity graph may be constructed from simulated HELLO messages that are received from an internal routing protocol private to network 105. These simulated HELLO messages may inform the mobile leaf router 115 as to the set of other routers in network 105, their distance from router 115, and their set of one-hop neighbors and distance to each. From these simulated HELLO messages, router 115 can determine its own set of one-hop neighbors, and whether or not it has bi-directional connectivity to each such neighbor. From the simulated HELLO messages, router 115 may construct a graph representing the connectivity with at least a set of other routers in network 105.

Router 115 may then affiliate with a standard area router (i.e., the "parent" router) to form an adjacency [act 1610]. Initially, mobile leaf router 115 may affiliate with a closest standard area router. As mobile leaf router 115 moves around, it may re-affiliate as needed to maintain a reasonably short path length between itself and its parent router. Mobile leaf router 115 may affiliate with any standard area router, regardless of whether or not it is an OSPF "designated router." The parent router may serve as a border router between the standard area and the area whose sole member in sub-network 105 is the mobile leaf router 115.

Mobile leaf router 115 may exchange routing advertisements with the standard area router (i.e., the "parent" router) [act 1615]. The routing information exchanged on the adjacency may include: a) a link-state advertisement generated by the parent router announcing its interface onto sub-network 105; b) a summary route advertisement or external route advertisement generated by the parent router advertising a default route to networks external to sub-network 105; c) a link-state advertisement generated by mobile leaf router 115 advertising its interfaces, including its interface onto sub-network 105; and d) link-state advertisements for router(s) behind mobile leaf router 115 in the mobile leaf area. The "parent" router may convert the latter two into a summary route advertisement or external router advertisement describing the mobile leaf area which can then be advertised into the standard area.

A determination may be made whether one or more specified events have occurred [act 1620]. Router 120 may, for example, monitor simulated HELLO messages looking for changes to the connectivity graph. If one or more specified events have occurred, then the exemplary process may return to act 1605 to re-fresh the connectivity graph 200. For example, if changes to the connectivity graph are noted, then mobile leaf router 115 may re-initiate acts 1605-1615. If one or more of the specified events have not occurred, then a determination may be whether it is time for a periodic re-fresh [act 1625]. For example, acts 1605-1615 may be re-initiated on a periodic basis (i.e., a periodic "re-fresh"). If it is not time for the periodic re-fresh, then the exemplary process may return to act 1620. If it is time for a periodic re-fresh, then the exemplary process may return to act 1605.

Exemplary Mobile Leaf Router Connectivity Graph Acquisition Process

Figure 17:
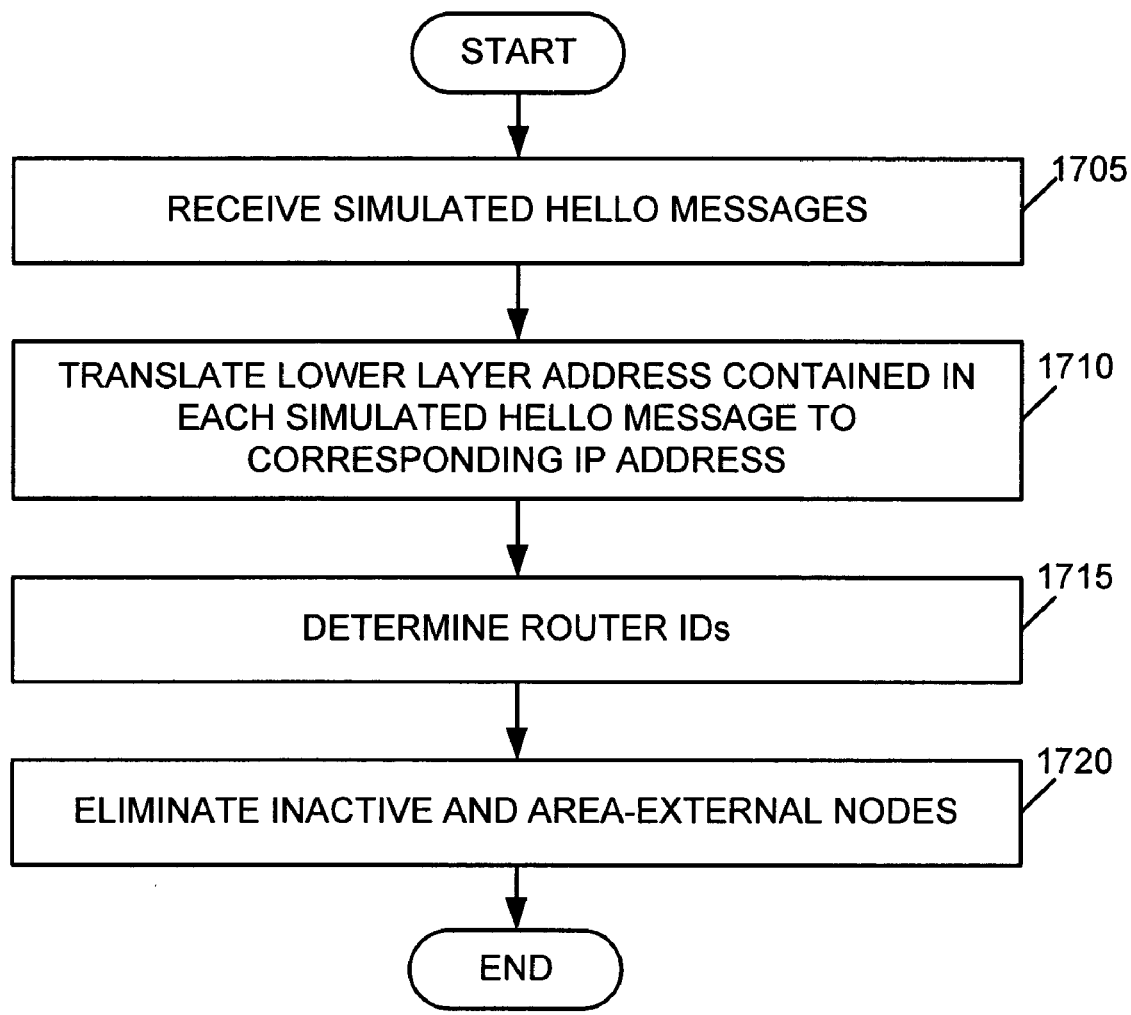
FIG. 17 is a flow chart that illustrates an exemplary process, corresponding to act 1605 of FIG. 16, for acquiring a connectivity graph at a mobile leaf router.

FIG. 17 is a flow chart that illustrates an exemplary process, consistent with the present invention, for acquiring a connectivity graph at a mobile leaf router 115 of network 100. The acts of the exemplary process of FIG. 17 provide further detail to act 1605 of FIG. 16.

The exemplary process may begin with the receipt of simulated HELLO messages [act 1705]. Simulated HELLO messages may be generated by a private routing protocol internal to sub-network 105 and may include, for example, data specifying the type of node represented by the simulated HELLO message, the lower layer address of the node's interface onto sub-network 105 and a cost of the remote node from router 115. A private routing protocol may generate a simulated HELLO message representing each router 120 in sub-network 105 every HELLOINTERVAL seconds, where HELLOINTERVAL is a parameter that specifies an exact periodic interval for sending the HELLO messages.

HELLOINTERVAL need not be the same for every router and may change dynamically. Alternatively, the private routing protocol may generate a simulated HELLO message representing a router 120 in sub-network 105 in response to some event, such as receipt of a routing update through the private routing protocol.

A lower layer address contained in each received simulated HELLO message may be translated into a corresponding Internet Protocol (IP) address [act 1710]. This translation may be performed by a mechanism, such as, for example, Ethernet ARP. OSPF Router IDs may be determined [act 1715]. An OSPF Router ID, associated with each router 115/120 in sub-network 105, may be determined from OSPF link-state advertisement packets, database description packets, link-state request packets, or other OSPF protocol packets received from a respective router 115/120.

Inactive and other mobile leaf routers may be eliminated from the connectivity graph [act 1720]. Routers identified by a flag in their simulated HELLO messages as being not active may be eliminated from the connectivity graph. Additionally, other mobile leaf routers may be eliminated from the connectivity graph. These may be identified, for example, by their IP addresses. Routers may be eliminated from the connectivity graph by first considering a set of all the vertices adjacent to the vertex to be eliminated. The vertex to be eliminated and all edges leading to it may be deleted from the graph. Then, new edges may be inserted connecting all vertices to which the deleted vertex had previously been adjacent, and assigned costs equal to the sum of the costs along the two edges that it replaces. This process may be repeated until all such vertices have been eliminated.

Exemplary Mobile Leaf Router Affiliation Process

Figure 18:
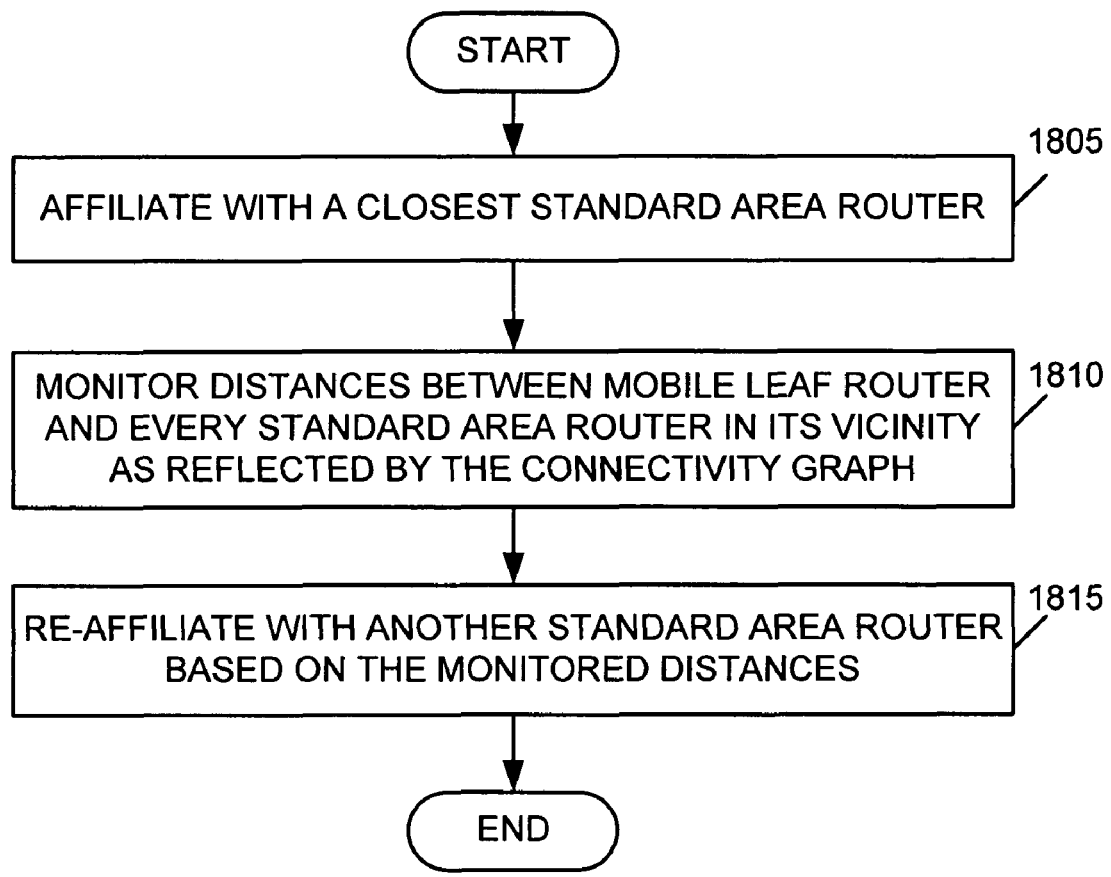
FIG. 18 is a flow chart that illustrates an exemplary process, corresponding to act 1610 of FIG. 16, for affiliating with a standard area router to form an adjacency.

FIG. 18 is a flow chart that illustrates an exemplary process, consistent with the present invention, for a mobile leaf router 115 to affiliate with a standard area router 120 of network 100. The acts of the exemplary process of FIG. 18 provide further detail to act 1610 of FIG. 16.

The exemplary process may begin with mobile leaf router 115 affiliating with a closest standard area router 120 [act 1805]. Mobile leaf router 115 may determine the standard area router 120 with which to affiliate from information contained in the connectivity graph constructed from the simulated HELLO messages received from the private, internal routing protocol of sub-network 105. The distances determined from the connectivity graph may be modified, for example, by configured values so as to establish a preference for affiliation with certain routers. Mobile leaf router 115 may then continue to monitor distances between itself and every standard area router 120 in mobile leaf router's vicinity, as reflected by the connectivity graph, to determine whether or not it should reaffiliate with a different parent router [act 1810]. To avoid bouncing between one parent router and another, it should not reaffiliate just because some other potential parent router has become closer, but instead apply, for example, a hysteresis check. For example, let $c_i$ be router 115's cost to the $i^{th}$ neighboring router, and c be the cost to router 115's current affiliated router (both c and $c_i$ may change with time). The time-integral of the advantage (Cadvaniage) of affiliating with a different router may be computed by Eqn. (1) above. Mobile leaf router 115 may then re-affiliate with another standard area router based on the monitored distances [act 1815]. For example, if $C_{advantage}$ exceeds a configurable threshold value, then mobile leaf router 115 may re-affiliate with a corresponding router, which is now closest.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while this invention is described herein in terms of its applicability to a packet radio network, it will be appreciated, that the actual physical means of communication employed by that network may vary. It may include wired, radio, sonar, optical, microwave, and other physical means of communication. Likewise, while the invention is described in terms of integrating a packet radio network into an overall OSPF routing environment, the actual routing protocol into which the packet radio network is to be integrated may vary. It may include variants and future derivatives of OSPF, other link-state routing protocols, hybrids, and variants thereof, which may form components of the IPv4 protocol suite, the IPv6 protocol suite, the OSI protocol suite, other networking suites, or may stand independently.

While series of acts have been described with regard to FIGS. 5-8, 10-13 and 15-18, the order of the acts may be modified in other implementations consistent with the principles of the invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The phrase "based on" is intended to mean "based, at least in part, on" unless explicitly stated otherwise.

As one skilled in the art will appreciate, the exemplary processes of FIGS. 5-8, 10-13 and 15-18 can be implemented in logic, such as, for example, combinational logic, within each router 115 or 120 of network 100. Furthermore, the exemplary processes of FIGS. 5-8, 10-13 and 15-18 can be implemented in software and stored on a computer-readable memory, such as Random Access Memory (RAM) or Read Only Memory (ROM), associated with each router 115 or 120 of network 100. Additionally, the exemplary processes of FIGS. 5-8, 10-13 and 15-18 may be implemented in any combination of software or hardware.

The scope of the invention is defined by the following claims and their equivalents.

What is claimed is:

1. A method of exchanging first routing data that is generated and employed by a link-state routing algorithm that is implemented internal and external to a first network, the method comprising:

constructing a connectivity graph that indicates connectivity between a first node and a first set of nodes in the first network, where connectivity between the first node and at least one node of the first set is provided by forwarding data within the first network based upon second routing data internal to the first network;

constructing an adjacency graph, based at least in part upon information contained in the connectivity graph, that indicates a second set of nodes with which the first node will exchange the first routing data that is generated and employed by the link-state routing algorithm that is implemented internal and external to the first network, where the adjacency graph is distinct from the connectivity graph and where constructing the adjacency graph comprises:

electing one or more nodes from the connectivity graph as a head of a cluster of a third set of nodes, forming, for every node of the connectivity graph that is not a cluster head, an adjacency with a next hop node along a shortest path to a closest cluster head, and selecting one or more nodes as adjacency connectors between each of the clusters of nodes; and exchanging the first routing data between the first node and each node of the second set of nodes based on the adjacency graph, where the first routing data is generated and employed by the link-state routing algorithm that is implemented internal and external to the first network and is distinct from the second routing data internal to the first network.

2. The method of claim 1, where the second set of nodes is a subset of the first set of nodes.

3. A method of exchanging first routing data that is generated and employed by a link-state routing algorithm that is implemented internal and external to a first network, the method comprising:

constructing a connectivity graph that indicates connectivity between a first node and a first set of nodes in the first network, where connectivity between the first node and at least one node of the first set is provided by forwarding data within the first network based upon second routing data internal to the first network;

constructing an adjacency graph, based at least in part upon information contained in the connectivity graph, that indicates a second set of nodes with which the first node will exchange the first routing data that is generated and employed by the link-state routing algorithm that is implemented internal and external to the first network, where the adjacency graph is distinct from the connectivity graph and where constructing the adjacency graph comprises:

determining an area-specific connectivity graph from the connectivity graph, from which all nodes not belonging to a configured subset of the first set of nodes have been eliminated, and determining a shortest-path spanning tree of the area-specific connectivity graph, where the shortest-path spanning tree comprises the adjacency graph; and exchanging the first routing data between the first node and each node of the second set of nodes based on the adjacency graph, where the first routing data is generated and employed by a link-state routing algorithm that is implemented internal and external to the first network and is distinct from the second routing data that is internal to the first network.

4. A method of exchanging routing data, comprising:

constructing a connectivity graph that indicates connectivity between a first node and a first set of nodes in a first network, where connectivity between the first node and at least one node of the first set is provided by forwarding data within the first network based upon second routing data internal to the first network;

constructing an adjacency graph, based at least in part upon information contained in the connectivity graph, that indicates a second set of nodes with which the first node will exchange the first routing data, where the adjacency graph is distinct from the connectivity graph and where constructing the adjacency graph comprises:

searching the connectivity graph to locate a second node within a distance of $C_1$ from the first node that belongs to a configured subset of the first set of nodes and that has a lowest ordinal number within that search distance, and including the located second node within the adjacency graph; and exchanging the first routing data between the first node and each node of the second set of nodes based on the adjacency graph, where the first routing data is distinct from the second routing data internal to the first network.

5. The method of claim 4, where constructing the adjacency graph further comprises:

searching the connectivity graph to locate the second node within a distance of $C_2$ from the first node, if the second node is not located within the distance $C_1$ from the first node, where the second node belongs to the configured subset of the first set of nodes and has a lowest ordinal number within that search distance; and including the located second node within the adjacency graph.

6. A method of exchanging routing data, comprising:

constructing a connectivity graph that indicates connectivity between a first node and a first set of nodes in a first network, where connectivity between the first node and at least one node of the first set is provided by forwarding data within the first network based upon second routing data internal to the first network;

constructing an adjacency graph, based at least in part upon information contained in the connectivity graph, that indicates a second set of nodes with which the first node will exchange the first routing data, where the adjacency graph is distinct from the connectivity graph and where constructing the adjacency graph comprises:

searching the connectivity graph to locate a second node within a distance of $C_1$ from the first node that belongs to a configured subset of the first set of nodes and that has a highest ordinal number within that search distance, and including the located second node within the adjacency graph; and exchanging the first routing data between the first node and each node of the second set of nodes based on the adjacency graph, where the first routing data is distinct from the second routing data internal to the first network.

7. The method of claim 6, where constructing an adjacency graph further comprises:
- searching the connectivity graph to locate the second node within a distance of $C_2$ from the first node, if the second node is not located within the distance $C_1$ from the first node, where the second node belongs to the configured subset of the first set of nodes and has a highest ordinal number within that search distance; and
- including the located second node within the adjacency graph.

8. A method of exchanging routing data, comprising:
- constructing a connectivity graph that indicates connectivity between a first node and a first set of nodes in a first network, where connectivity between the first node and at least one node of the first set is provided by forwarding data within the first network based upon second routing data internal to the first network;
- constructing an adjacency graph, based at least in part upon information contained in the connectivity graph, that indicates a second set of nodes with which the first node will exchange the first routing data, where the adjacency graph is distinct from the connectivity graph and where constructing the adjacency graph comprises:
  - identifying a second node, from the first set of nodes, that neighbors the first node and that has a lower ordinal number, and
  - including the identified second node within the adjacency graph; and
- exchanging the first routing data between the first node and each node of the second set of nodes based on the adjacency graph, where the first routing data is distinct from the second routing data internal to the first network.

9. The method of claim 8, where the second node is within a configured subset of the first set of nodes.

10. A method of selecting nodes from a plurality of nodes in a first network for exchanging first routing data that is generated and employed by a link-state routing algorithm that is implemented internal and external to the first network, the method comprising:
- acquiring a connectivity graph that indicates connectivity between a first node and a first set of nodes in the first network, where connectivity between the first node and at least one node of the first set is provided by forwarding data within the first network based upon second routing data internal to the first network;
- constructing, based at least in part upon information contained in the connectivity graph, an adjacency graph that is distinct from the connectivity graph, by selecting a second set of nodes from the first set of nodes, where the second set of nodes is a subset of the first set of nodes and where selecting the second set of nodes comprises:
  - determining an area-specific connectivity graph from the connectivity graph, from which all nodes not belonging to a configured subset of the first set of nodes have been eliminated, and
  - determining a shortest-path spanning tree of the area-specific connectivity graph, where the second set of nodes comprises at least a portion of nodes comprising the shortest-path spanning tree; and
- exchanging the first routing data, between the first node and each node of the selected second set of nodes, where the first routing data is generated and employed by the link-state routing algorithm that is implemented internal and external to the first network and is distinct from the second routing data internal to the first network.

11. A method of selecting nodes from a plurality of nodes for exchanging routing data, comprising:
- acquiring a connectivity graph that indicates connectivity between a first node and a first set of nodes in a first network, where connectivity between the first node and at least one node of the first set is provided by forwarding data within the first network based upon second routing data internal to the first network;
- constructing, based at least in part upon information contained in the connectivity graph, an adjacency graph that is distinct from the connectivity graph, by selecting a second set of nodes from the first set of nodes, where the second set of nodes is a subset of the first set of nodes and where selecting the second set of nodes comprises:
  - searching the connectivity graph to locate a second node within a distance of $C_1$ from the first node that belongs to a configured subset of the first set of nodes and that has a lowest ordinal number within that search distance, and
  - including the located second node within the second set of nodes; and
- exchanging the first routing data between the first node and each node of the selected second set of nodes, where the first routing data is distinct from the second routing data internal to the first network.

12. The method of claim 11, where selecting the second set of nodes comprises:
- searching the connectivity graph to locate the second node within a distance of $C_2$ from the first node, if the second node is not located within the distance $C_1$ from the first node, where the second node belongs to the configured subset of the first set of nodes and has a lowest ordinal number within that search distance; and
- including the located second node within the second set of nodes.

13. A method of selecting nodes from a plurality of nodes for exchanging routing data, comprising:
- acquiring a connectivity graph that indicates connectivity between a first node and a first set of nodes in a first network, where connectivity between the first node and at least one node of the first set is provided by forwarding data within the first network based upon second routing data internal to the first network;
- constructing, based at least in part upon information contained in the connectivity graph, an adjacency graph that is distinct from the connectivity graph, by selecting a second set of nodes from the first set of nodes, where the second set of nodes is a subset of the first set of nodes and where selecting the second set of nodes comprises:
  - searching the connectivity graph to locate a second node within a distance of $C_1$ from the first node that belongs to a configured subset of the first set of nodes and that has a highest ordinal number within that search distance, and
  - including the located second node within the second set of nodes; and
- exchanging the first routing data between the first node and each node of the selected second set of nodes, where the first routing data is distinct from the second routing data internal to the first network.

14. The method of claim 13, where electing the second set of nodes comprises:
- searching the connectivity graph to locate the second node within a distance of $C_2$ from the first node, if the second node is not located within the distance $C_1$ from the first node, where the second node belongs to the configured subset of the first set of nodes and has a highest ordinal number within that search distance; and
including the located second node within the second set of nodes.

15. A method of selecting nodes from a plurality of nodes for exchanging routing data, comprising:
acquiring a connectivity graph that indicates connectivity between a first node and a first set of nodes in a first network, where connectivity between the first node and at least one node of the first set is provided by forwarding data within the first network based upon second routing data internal to the first network;
constructing, based at least in part upon information contained in the connectivity graph, an adjacency graph that is distinct from the connectivity graph, by selecting a second set of nodes from the first set of nodes, where the second set of nodes is a subset of the first set of nodes and where selecting the second set of nodes comprises:
identifying a second node, from the first set of nodes, that neighbors the first node and that has a lower ordinal number, and
including the identified second node within the second set of nodes; and
exchanging the first routing data between the first node and each node of the selected second set of nodes, where the first routing data is distinct from the second routing data internal to the first network.

16. The method of claim 15, where the second node is within a configured subset of the first set of nodes.

17. A method of selecting adjacent nodes for the exchange of first routing data, comprising:
acquiring a connectivity graph that indicates connectivity between a first node and a plurality of other nodes, where node identifying ordinal numbers are associated with each of the first node and the plurality of other nodes, and where connectivity between the first node and at least one node of the plurality of other nodes is provided by forwarding data among the plurality of nodes based upon second routing data internal to the plurality of nodes;
searching the connectivity graph to locate a second node within a distance of $C_1$ from the first node that belongs to a configured subset of the first set of nodes and that has at least one of a highest or lowest ordinal number within that search distance; and
exchanging the first routing data with the second node if the second node exists and is located within the distance of $C_1$ from the first node, where the routing data is distinct from the second routing data internal to the plurality of nodes.

18. The method of claim 17, where the distance $C_1$ comprises a first number of hops from the first node.

19. The method of claim 18, further comprising:
searching the connectivity graph to locate the second node within a distance of $C_2$ from the first node, if the second node is not located within the distance $C_1$ from the first node, where the second node belongs to a configured subset of the first set of nodes and has a lowest ordinal number within that search distance; and
exchanging routing data with the second node if the second node is located within the distance of $C_2$.

20. The method of claim 19, where the distance of $C_2$ comprises a second number of hops from the first node, where the second number of hops is greater than the first number of hops.

21. A method of selecting adjacent nodes for an exchange, in a first network, of first routing data that is generated and employed by a link-state routing algorithm that is implemented internal and external to the first network, the method comprising:
acquiring a connectivity graph that indicates connectivity between a plurality of nodes, where connectivity between at least two nodes among the plurality of nodes is provided by forwarding data among the plurality of nodes based upon second routing data internal to the plurality of nodes;
determining an area-specific connectivity graph by eliminating from the connectivity graph all nodes of the plurality of nodes that are inactive, external, or do not belong to a configured subset of a first set of nodes;
electing one or more nodes from the connectivity graph as a head of a cluster of a set of nodes of the plurality of nodes, where each node of the plurality of nodes has a priority for election as a cluster head;
forming, for every node of the connectivity graph that is not a cluster head, an adjacency with a next hop node along a shortest path to a closest cluster head;
selecting one or more nodes of the connectivity graph, as adjacency connectors between each of the clusters of nodes; and
exchanging, between at least two nodes of the plurality of nodes, the first routing data that is generated and employed by a link-state routing algorithm that is implemented internal and external to the first network, where the first routing data is distinct from the second routing data that is internal to the plurality of nodes.

22. A method of selecting adjacent nodes for the exchange of first routing data, comprising:
acquiring a connectivity graph that indicates connectivity between a plurality of nodes, each of the plurality of nodes having an associated identification number, where connectivity between at least two nodes among the plurality of nodes is provided by forwarding data among the plurality of nodes based upon second routing data internal to the plurality of nodes;
determining an area-specific connectivity graph by eliminating from the connectivity graph all nodes that are inactive, external, or do not belong to a configured subset of the plurality of nodes;
determining a shortest-path spanning tree of the connectivity graph, where the shortest-path spanning tree comprises a set of nodes of the plurality of nodes, where the shortest-path spanning tree is rooted at a selected node of the plurality of nodes, and where the selected node comprises at least one of a lowest node identification number or a highest node identification number in the spanning tree; and
exchanging the first routing data between each of the nodes of the set of nodes of the shortest-path spanning tree, where the first routing data is distinct from the second routing data internal to the plurality of nodes.

23. The method of claim 22, where each node of the plurality of nodes establishes an adjacency with a next node on a path to the selected node.

24. A method of selecting adjacent nodes for the exchange of first routing data, comprising:
acquiring a connectivity graph that indicates connectivity between a first node and a plurality of other nodes, where node identifying ordinal numbers are associated with each of the first node and the plurality of other nodes, and where connectivity between at least two nodes among a plurality of nodes is provided by forwarding data among the plurality of nodes based upon second routing data internal to the plurality of nodes;

selecting a second node of the plurality of other nodes that neighbors the first node and that has a lower ordinal number; and exchanging the first routing data with the selected second node, where the first routing data is distinct from the second routing data internal to the plurality of nodes.

25. The method of claim 24, where selecting the second node further comprises:

selecting the second node that is closest to the first node and that has the lower ordinal number.

26. The method of claim 25, where selecting the second node further comprises:

selecting the second node that is in a configured subset of the first set of nodes.

27. The method of claim 24, further comprising:

determining if a third node of the plurality of other nodes neighbors the first node and has a lower ordinal number than the second node; and exchanging routing data with the third node based on the determination.

* * * * *